(12) United States Patent
Lin et al.

(10) Patent No.: US 11,560,663 B2
(45) Date of Patent: Jan. 24, 2023

(54) PLANETARY GEAR ASSEMBLY FOR DRUM WASHING MACHINE AND DRUM WASHING MACHINE

(71) Applicant: WUXI LITTLE SWAN ELECTRIC CO., LTD., Wuxi (CN)

(72) Inventors: Guangfang Lin, Wuxi (CN); Song Lu, Wuxi (CN); Yulai Miao, Wuxi (CN); Wei Qian, Wuxi (CN); Chunyu Zhu, Wuxi (CN)

(*) Notice: Subject to any disclaimer, the term of this patent is extended or adjusted under 35 U.S.C. 154(b) by 259 days.

(21) Appl. No.: 16/772,120

(22) PCT Filed: May 31, 2018

(86) PCT No.: PCT/CN2018/089334
§ 371 (c)(1),
(2) Date: Jun. 11, 2020

(87) PCT Pub. No.: WO2019/153593
PCT Pub. Date: Aug. 15, 2019

(65) Prior Publication Data
US 2021/0071342 A1 Mar. 11, 2021

(30) Foreign Application Priority Data

Feb. 7, 2018 (CN) .......................... 201810122495.3
Feb. 7, 2018 (CN) .......................... 201820221165.5

(51) Int. Cl.
*D06F 23/02* (2006.01)
*D06F 37/30* (2020.01)
(Continued)

(52) U.S. Cl.
CPC .............. *D06F 37/40* (2013.01); *D06F 23/02* (2013.01); *D06F 37/304* (2013.01); *F16H 1/28* (2013.01)

(58) Field of Classification Search
None
See application file for complete search history.

(56) References Cited

U.S. PATENT DOCUMENTS 6,202,451 B1 3/2001 Park et al.
2004/0035155 A1 2/2004 Yoon
(Continued)

FOREIGN PATENT DOCUMENTS

CN 101024913 A 8/2007
CN 200981939 Y 11/2007
(Continued)

OTHER PUBLICATIONS

The first OA dated Mar. 19, 2019 for CN application 201810122495.3.
(Continued)

*Primary Examiner* — Levon J Shahinian
(74) *Attorney, Agent, or Firm* — Kilpatrick Townsend & Stockton, LLP

(57) ABSTRACT

A planetary gear assembly for a drum washing machine and a washing machine are provided. The planetary gear assembly includes a planetary gear component. The planetary gear component includes a planet carrier, a plurality of planetary gears rotatably mounted to the planet carrier separately and configured to be meshed with a main shaft separately, the main shaft being configured to drive a drum to rotate in a drum washing machine; and a planetary gear outer teeth casing fitted over an outer side of the plurality of planetary gears, meshed with the plurality of planetary gears separately, and configured to be in transmission connection with an agitator in the drum.

15 Claims, 11 Drawing Sheets

(51) Int. Cl.
*D06F 37/40* (2006.01)
*F16H 1/28* (2006.01)

(56) References Cited

U.S. PATENT DOCUMENTS

| | | | |
|---|---|---|---|
| 2005/0011235 A1 | 1/2005 | Park et al. | |
| 2007/0050921 A1* | 3/2007 | Wilson | D06F 37/304 |
| | | | 68/12.24 |

FOREIGN PATENT DOCUMENTS

| | | |
|---|---|---|
| CN | 101210372 A | 7/2008 |
| CN | 101210373 A | 7/2008 |
| CN | 104790176 A | 7/2015 |
| CN | 206784016 U | 12/2017 |
| CN | 207987542 U | 10/2018 |
| JP | S60144415 U | 9/1985 |
| JP | 2000042286 A | 2/2000 |
| JP | 2008104684 A | 5/2008 |
| JP | 2017032045 A | 2/2017 |
| KR | 20030008351 A | 1/2003 |
| WO | 2015109915 A1 | 7/2015 |

OTHER PUBLICATIONS

The second OA dated Oct. 10, 2019 for CN application 201810122495.3.
ISR for PCT application No. PCT/CN2018/089334.
OA for JP application 2020-514519.

* cited by examiner

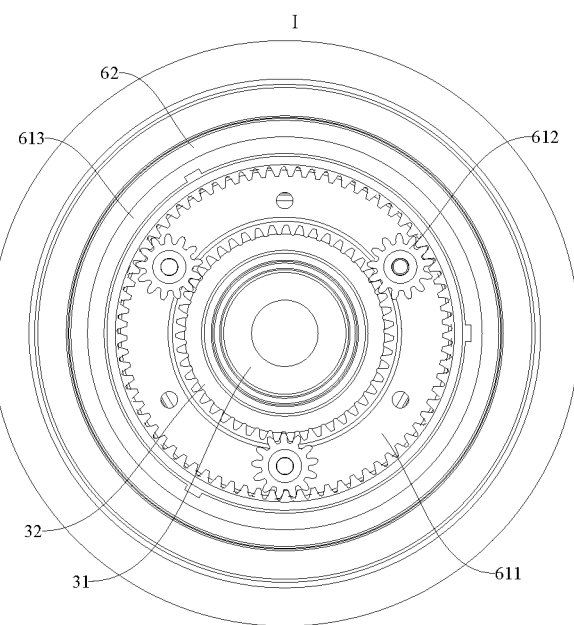
Fig. 18
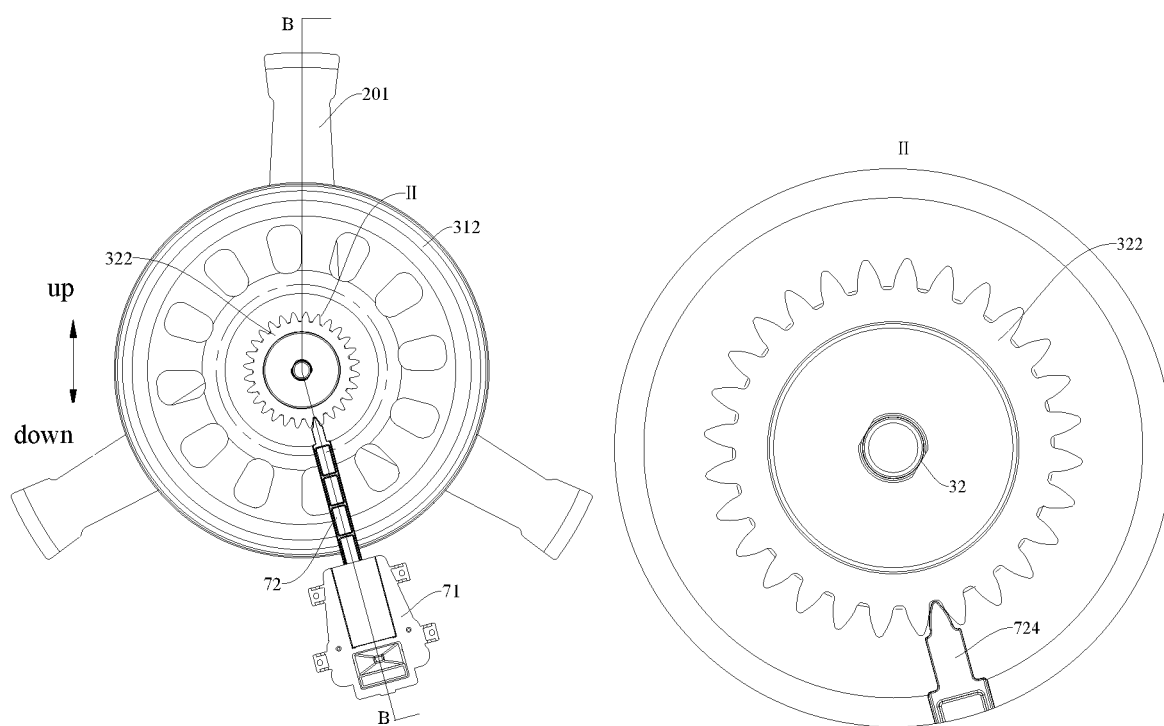
Fig. 19
Fig. 20

PLANETARY GEAR ASSEMBLY FOR DRUM WASHING MACHINE AND DRUM WASHING MACHINE

CROSS-REFERENCES TO RELATED APPLICATIONS

The present disclosure is a national phase application of International Application No. PCT/CN2018/089334, filed on May 31, 2018, which claims the priority of Chinese Application No. 201820221165.5 and 201810122495.3, filed in the Chinese Patent Office on Feb. 7, 2018, the entireties of which are herein incorporated by reference.

FIELD

The present disclosure relates to the field of laundry treatment devices, and more particularly to a planetary gear assembly for a drum washing machine and a drum washing machine.

BACKGROUND

When laundry is washed in a drum washing machine, a drum is rotated to drive the laundry and water in the drum to rotate and wash the laundry, and the laundry is lifted up and down by a baffle in the drum and is dropped by an inner circumferential surface of the drum. However, due to a single washing mode, the washing effect is affected. Therefore, there is a need for improvement.

To this end, a drum washing machine provided with an impeller in a drum is proposed in a related art. For example, PCT/CN2016/11037 discloses a drum-type washing machine, in which the impeller is directly driven to rotate by an electric motor while the electric motor drives the drum to rotate by means of transmission of a planetary gear mechanism, and a rotational speed of the drum is less than a rotational speed of the impeller. However, since the drum itself has a larger volume than the impeller does, and the drum is required to carry the laundry and the water during washing, the planetary gear mechanism has a relatively large load, to affect the effect of transmission of power by the planetary gear mechanism and the service life thereof.

SUMMARY

The present disclosure seeks to solve at least one of the problems existing in the related art to at least some extent. To this end, the present disclosure proposes a planetary gear assembly for a drum washing machine, the planetary gear assembly can transmit a torque of a main shaft to an agitator, to dually drive a drum and the agitator, and the a planetary gear assembly can transmit power stably and has a long service life, or the like.

The present disclosure further proposes a drum washing machine having the planetary gear assembly.

The planetary gear assembly for a drum washing machine according to embodiments of a first aspect of the present disclosure includes a planetary gear component. The planetary gear component includes: a planet carrier; a plurality of planetary gears rotatably mounted to the planet carrier separately and configured to be meshed with a main shaft separately, the main shaft being configured to drive a drum to rotate in a drum washing machine; and a planetary gear outer teeth casing fitted over an outer side of the plurality of planetary gears, meshed with the plurality of planetary gears separately, and configured to be in transmission connection with an agitator in the drum.

In the planetary gear assembly for a drum washing machine according to embodiments of the present disclosure, by providing the planetary gear assembly between the main shaft and the agitator, the torque of the main shaft can be transmitted to the agitator to drive the agitator to rotate, the rotation of the agitator may be combined with the rotation of the drum into various washing modes, for example, only one of the agitator and the drum is rotated or the agitator and the drum are rotated at the same time, or in the same direction, or in opposite directions, to diversify the washing mode of the drum washing machine.

Moreover, the torque of the main shaft is transmitted to the agitator by the planetary gear assembly, the agitator can be indirectly driven using the driver. Since the load at the agitator is much less than the load at the drum, compared with a drum washing machine with an impeller (agitator) in the related art, the load acting on the planetary gear assembly is greatly reduced, which not only facilitates stable power transmission to improve the performance stability of the drum washing machine, but also greatly reduces the risk of damage to the planetary gear assembly, to prolong the service life of the drum washing machine.

According to an embodiment of the present disclosure, when the planet carrier is allowed to rotate freely, the plurality of planetary gears transmit a torque of the main shaft to the planetary gear outer teeth casing in a same direction, and when the planet carrier is braked, the plurality of planetary gears transmit the torque of the main shaft to the planetary gear outer teeth casing in an opposite direction.

In one embodiment, when the planet carrier is braked, a rotational speed of the planetary gear outer teeth casing is less than a rotational speed of the main shaft.

In one embodiment, when the planet carrier is allowed to rotate freely, a rotational speed of the planetary gear outer teeth casing is equal to a rotational speed of the main shaft.

According to an embodiment of the present disclosure, the planet carrier includes a planetary gear support, the plurality of planetary gears are rotatably mounted on a side face of the planetary gear support, and the side face of the planetary gear support is provided with a plurality of mounting bosses; and a planetary gear fixing disk mounted on the plurality of mounting bosses.

In one embodiment, the planetary gear support and the planetary gear fixing disk are both located in the planetary gear outer teeth casing, and the planetary gear support and the planetary gear fixing disk are stopped at two sides of internal teeth of the planetary gear outer teeth casing respectively to be positioned in an axial direction of the planetary gear outer teeth casing.

In one embodiment, the side face of the planetary gear support is provided with a plurality of planetary gear mounting seats, each of the planetary gear seats is provided with a planetary gear fixing shaft, and the plurality of planetary gears are rotatably mounted to the plurality of planetary gear fixing shafts in one-to-one correspondence respectively.

In one embodiment, the plurality of mounting bosses and the plurality of planetary gears are arranged alternately in a circumferential direction of the planetary gear support, each of the mounting bosses is provided with a positioning column, the planetary gear fixing disk is provided with a plurality of positioning holes, and positioning columns on the plurality of mounting bosses are fitted in the plurality of positioning holes in one-to-one correspondence.

According to an embodiment of the present disclosure, the planetary gear assembly further includes a planetary gear casing, the planetary gear component is provided in the planetary gear casing, and the planetary gear outer teeth casing is in transmission connection with the agitator via the planetary gear casing.

In one embodiment, one of an inner peripheral wall of the planetary gear casing and an outer peripheral wall of the planetary gear outer teeth casing is provided with a flange, the other one of the inner peripheral wall of the planetary gear casing and the outer peripheral wall of the planetary gear outer teeth casing is provided with a latching slot, and the flange is fitted in the latching slot.

In one embodiment, the outer peripheral wall of the planetary gear outer teeth casing is provided with a plurality of flanges, each of the flanges extends in an axial direction of the planetary gear outer teeth casing, the plurality of flanges are spaced apart from each other in a circumferential direction of the planetary gear outer teeth casing, the inner peripheral wall of the planetary gear casing is provided with a plurality of latching slots, each of the latching slots extends in an axial direction of the planetary gear casing, the plurality of latching slots are spaced apart from each other in a circumferential direction of the planetary gear casing, and the plurality of flanges are fitted in the plurality of latching slots in one-to-one correspondence.

According to a further embodiment of the present disclosure, the planetary gear assembly further includes: a planetary gear bearing provided in the planetary gear casing and located on an outer side of the planetary gear component, an inner ring of the planetary gear bearing is fitted over the main shaft and rotates with the main shaft, an outer ring of the planetary gear bearing is connected to the planetary gear casing and rotates with the planetary gear casing.

In one embodiment, an inner peripheral surface of the planet carrier is provided with meshing teeth meshing with a second shaft in the main shaft.

Furthermore, the planetary gear assembly further includes a second shaft end bearing, the planetary gear casing is provided with a through hole, the second shaft passes through the through hole, and the second shaft end bearing is provided in the through hole and configured to support the second shaft.

In some examples, the planetary gear assembly further includes a shaft sealing member located in the through hole and at an outer side of the second shaft end bearing, and configured to seal a gap between the second shaft and the planetary gear casing.

The drum washing machine according to embodiments of a second aspect of the present disclosure includes the planetary gear assembly for a drum washing machine according to the above embodiments.

BRIEF DESCRIPTION OF THE DRAWINGS

Embodiments of the present disclosure will become apparent and readily appreciated from the following descriptions made with reference to the drawings.

FIG. 3 is an exploded view before the drum support is assembled with a main shaft, a second shaft, a planetary gear assembly of the drum washing machine, or the like;

FIG. 18 is an enlarged view of portion I shown in FIG. 17;

FIG. 19 is a schematic view of a drum washing machine viewed from the rear to the front, with a cabinet, drum and agitator removed;

FIG. 20 is an enlarged view of portion II shown in FIG. 19;

Figure 1:
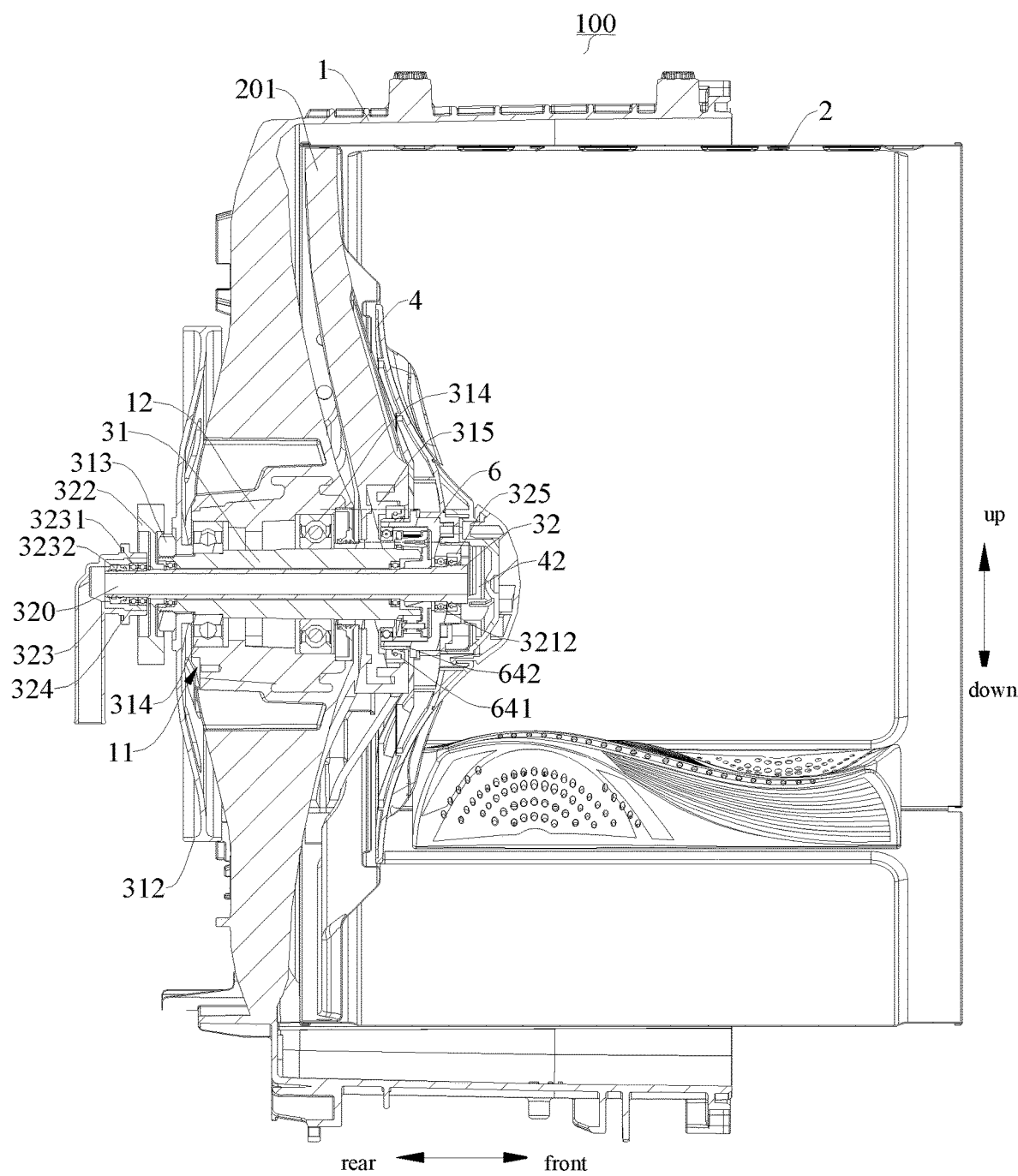
FIG. 1 is a schematic view of a drum washing machine according to an embodiment of the present disclosure.

REFERENCE NUMERALS drum washing machine 100, tub 1, mounting hole 11, main shaft bearing seat 12, drum 2, drum support 201, central shaft portion 2011, support portion 2012, drum body 21, rear cover 22 of the drum, main shaft 31, cavity 311, pulley 312, belt 3121, lock nut 313, main shaft bearing 314, main shaft flange 315, main shaft sleeve 316, second shaft 32, water supply passage 320, second shaft bearing 3211, second shaft end bearing 3212, brake disk 322, adapter 323, adapter bearing 3231, adapter sealing member 3232, wear ring 324, shaft sealing member 325, agitator 4, water spray hole 41, water collection cavity 42, water dividing passage 43, rib 44, electric motor 5, electric motor shaft 51, planetary gear assembly 6, planetary gear component 61, planet carrier 611, planetary gear support 6111, mounting boss 6112, positioning column 6113, planetary gear mounting seat 6114, planetary gear fixing shaft 6115, planetary gear fixing disk 6116, positioning hole 6117, limiting hole 6118, planetary gear 612, planetary gear outer teeth casing 613, flange 6131, planetary gear casing 62, latching slot 621, through hole 622, planetary gear bearing 63, assembly sealing member 641, wear sleeve 642, brake 7, sliding groove seat 71, slideway 711, limiting boss 712, circumferentially positioned sliding groove 713, support sliding groove 714, via hole 715, brake lever 72, limiting block 720, slideway fitting portion 721, axial reinforcing rib 7211, transmission portion 722, bridge portion 723, transverse reinforcing rib 7231, longitudinal reinforcing rib 7232, brake portion 724, straight sliding groove 725, brake driver 73, brake cam 74, eccentric column 741, brake support 75, limiting sliding groove 751.

DETAILED DESCRIPTION OF THE DISCLOSURE

Reference will be made in detail to embodiments of the present disclosure, and the examples of the embodiments are illustrated in the drawings, and the same or similar elements and the elements having same or similar functions are denoted by like reference numerals throughout the descriptions. The embodiments described herein with reference to drawings are illustrative, and merely used to explain the present disclosure. The embodiments shall not be construed to limit the present disclosure.

In the description of the present disclosure, it is to be understood that terms such as "center", "longitudinal," "transversal," "length", "width", "thickness", "upper", "lower", "front", "rear", "left", "right", "vertical", "horizontal", "top", "bottom", "inner", "outer", "clockwise", "anticlockwise", "axial", "radial", and "circumferential" should be construed to refer to the orientation as then described or as shown in the drawings under discussion. These relative terms are for convenience of description and do not require that the present disclosure be constructed or operated in a particular orientation, thus cannot be construed to limit the present disclosure. Furthermore, the feature defined with "first" and "second" may include one or more of this feature explicitly or implicitly. In the description of the present disclosure, the term "a plurality of" means two or more unless otherwise stated.

In the description of the present disclosure, it should be noted that unless specified or limited otherwise, the terms "mounted", "connected", and "coupled" and the like are used broadly, and may be, for example, fixed connections, detachable connections, or integral connections; may also be mechanical or electrical connections; may also be direct connections or indirect connections via intervening structures; may also be inner communications of two elements.

A planetary gear assembly for a drum washing machine according to embodiments of the present disclosure will be described below with reference to FIGS. 1 to 23.

As shown in FIGS. 1 to 23, the planetary gear assembly 6 for a drum washing machine according to embodiments of the present disclosure includes a planetary gear component 61.

The planetary gear component 61 includes a planet carrier 611, a plurality of planetary gears 612, and a planetary gear outer teeth casing 613. The plurality of planetary gears 612 are rotatably mounted to the planet carrier 611 respectively, and the plurality of planetary gears 612 are configured to be meshed with a main shaft 31 for driving the a drum 2 to rotate The planetary gear outer teeth casing 613 is fitted over the plurality of planetary gears 612, and the planetary gear outer teeth casing 613 meshes with the plurality of planetary gears 612 respectively, and the planetary gear outer teeth casing 613 is configured to be in transmission connection with the agitator 4.

In the planetary gear assembly 6 for a drum washing machine according to embodiments of the present disclosure, by providing the planetary gear assembly 6 between the main shaft 31 and the agitator 4, the torque of the main shaft 31 can be transmitted to the agitator 4 to drive the agitator 4 to rotate, the rotation of the agitator 4 may be combined with the rotation of the drum 2 into various washing modes, for example, only one of the agitator 4 and the drum 2 is rotated or the agitator 4 and the drum 2 are rotated at the same time, or in the same direction or in opposite directions, to diversify the washing mode of the drum washing machine 100.

Moreover, the torque of the main shaft 31 is transmitted to the agitator by the planetary gear assembly 6, and the agitator 4 is driven by the driver indirectly. Since the load of the agitator 4 is much less than the load of the drum 2, compared with the drum washing machine with an impeller (agitator) in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

According to an embodiment of the present disclosure, when the planet carrier 611 is allowed to rotate freely, the plurality of planetary gears 612 transmit a torque of the main shaft 31 to the planetary gear outer teeth casing 613 in a same direction. When the planet carrier 611 is braked, the plurality of planetary gears 612 transmit the torque of the main shaft 31 to the planetary gear outer teeth casing 613 in opposite directions.

For example, when the drum washing machine 100 is in a spin mode, the planet carrier 611 can be switched to be allowed to rotate freely, and the agitator 4 and the drum 2 are driven to rotate in the same direction by the planetary gear outer teeth casing 613, ensuring that the laundry will not be entangled or torn when spinning at a high speed.

When the drum washing machine 100 is in a wash mode, the planet carrier 611 is braked, and the agitator 4 and the drum 2 are driven to rotate in opposite directions by the planetary gear outer teeth casing 613, to agitate the laundry and water thoroughly to improve the effect of cleaning the laundry.

In one embodiment, the combination of the state switching of the planet carrier 611 of the planetary gear assembly 6 and the current mode of the drum washing machine 100 is not limited to the above-mentioned embodiments, and the free rotation state and the braking state of the planet carrier 611 may also be combined with any one of the spin and wash modes.

In some examples, when the planet carrier 611 is braked, the rotational speed of the planetary gear outer teeth casing 613 is less than the rotational speed of the main shaft 31. That is, when the planet carrier 611 is braked, the variable-speed transmission of power is implemented. Thus, when the laundry and the water are sufficiently agitated, the laundry is prevented from being entangled, and the stability and noise reduction of the whole machine are contributed.

In some examples, when the planet carrier 611 is allowed to rotate freely, the rotational speed of the planetary gear outer teeth casing 613 is equal to the rotational speed of the main shaft 31. That is, when the planet carrier 611 is allowed to rotate freely, the agitator 4 is rotated in synchronization with the drum 2 (at the same speed and in the same direction).

Figure 8:
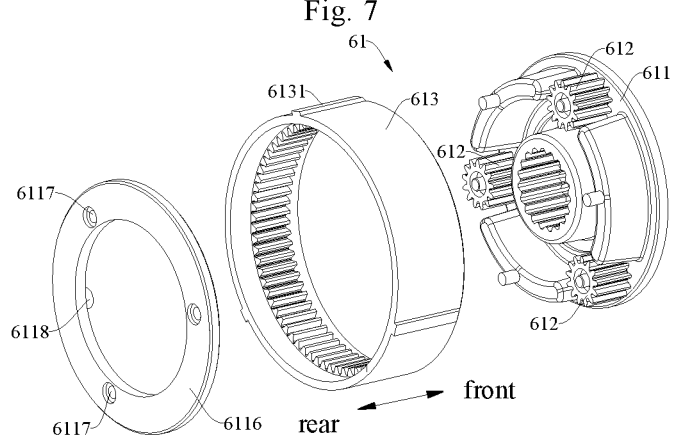
FIG. 8 is an exploded view of a planetary gear component of the drum washing machine.
Figure 9:
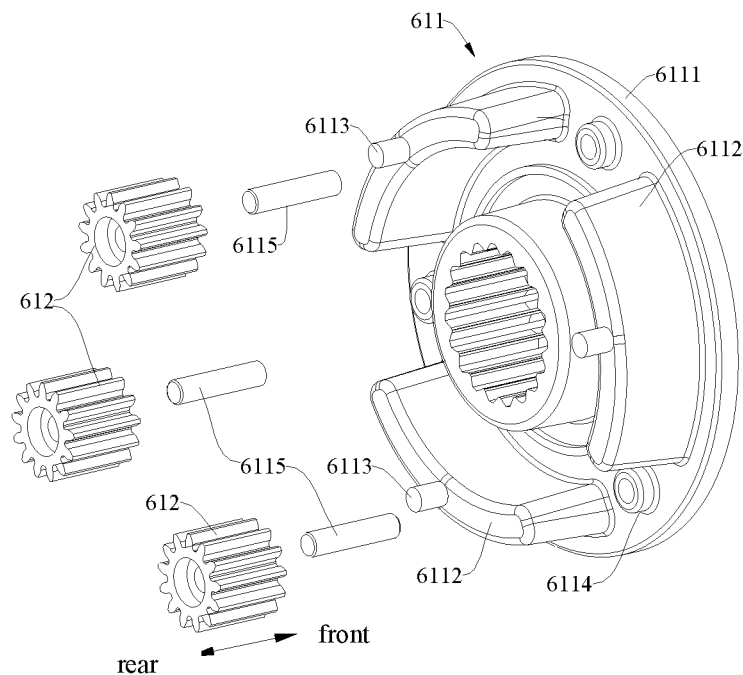
FIG. 9 is an exploded view before a planet carrier and a planetary gear shown in FIG. 8 are assembled.
Figure 10:
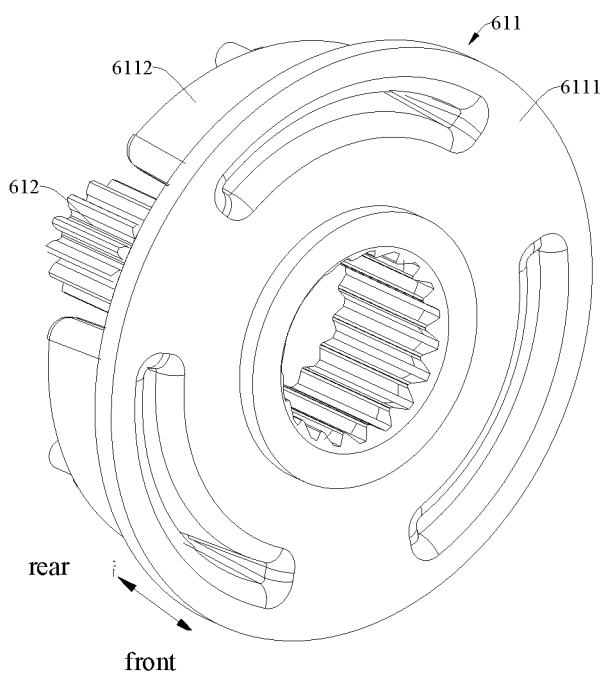
FIG. 10 is a schematic assembly view of the planet carrier and the planetary gear shown in FIG. 8.

Referring to FIGS. 8 to 10, the planet carrier 611 includes a planetary gear support 6111 and a planetary gear fixing disk 6116. A plurality of planetary gears 612 are rotatably mounted on one side face of the planetary gear support 6111, and one side face of the planetary gear support 6111 is provided with a plurality of mounting bosses 6112. The planetary gear fixing disk 6116 is mounted on the plurality of mounting bosses 6112, which facilitates the connection of the planetary gear support 6111 and the planetary gear fixing disk 6116.

In some examples, the planetary gear support 6111 and the planetary gear fixing disk 6116 are both located in the planetary gear outer teeth casing 613, and the planetary gear support 6111 and the planetary gear fixing disk 6116 are stopped at two sides of internal teeth of the planetary gear outer teeth casing 613 respectively, to position in an axial direction of the planetary gear outer teeth casing 613 by means of the internal teeth end of the planetary gear outer teeth casing 613. The plurality of planetary gears 612 may be positioned and mounted by the planetary gear support 6111. The combined structure of the planetary gear support 6111 and the planetary gear fixing disk 6116 may define the plurality of planetary gears between the planetary gear support 6111 and the planetary gear fixing disk 6116, realizing modular assembly of the structure, a more compact structure and convenient assembly.

In some examples, the planetary gear fixing disk 6116 is provided in the planetary gear outer teeth casing 613 and is secured to the planetary gear support 6111 by a fastener for reliable connection.

In some examples, a side face of the planetary gear support 6111 is provided with a plurality of planetary gear mounting seats 6114, and each of the planetary gear seats 6114 is provided with a planetary gear fixing shaft 6115, and the plurality of planetary gears 612 are rotatable respectively and mounted in one-to-one correspondence to the plurality of planetary gear fixing shafts 6115. Here, "one-to-one correspondence" may be construed as the equal number of planetary gears 612 and planetary gear mounting seats 6114, and each of the planetary gear mounting seats 6114 is provided with one planetary gear 612.

In some examples, the planetary gear mounting seat 6114 is provided with a plughole, one end of the planetary gear fixing shaft 6115 is inserted into the plughole of the planetary gear mounting seat 6114, and the other end of the planetary gear fixing shaft 6115 is placed in a limiting hole 6118 of the planetary gear fixing disk 6116, to position and mounting the planetary gear 612.

In some examples, a side face of the planetary gear support 6111 is provided with a plurality of mounting bosses 6112 and a plurality of planetary gear mounting seats 6114, the plurality of mounting bosses 6112 and the plurality of planetary gear mounting seats 6114 are arranged alternately in a circumferential direction of the planetary gear support 6111, and the plurality of mounting bosses 6112 and the plurality of planetary gears 612 are arranged alternately in a circumferential direction of the planetary gear support 6111.

Furthermore, each of the mounting bosses 6112 is provided with a positioning column 6113, the planetary gear fixing disk 6116 is provided with a plurality of positioning holes 6117, the positioning columns 6113 on the plurality of mounting bosses 6112 are in a close fit or welded in the plurality of positioning holes 6117 in one-to-one correspondence, and the planetary gear fixing disk 6116 is supported on the plurality of mounting bosses 6112, to implement the assembly of the planetary gear fixing disk 6116 and the planetary gear support 6111, with convenient connection.

Figure 7:
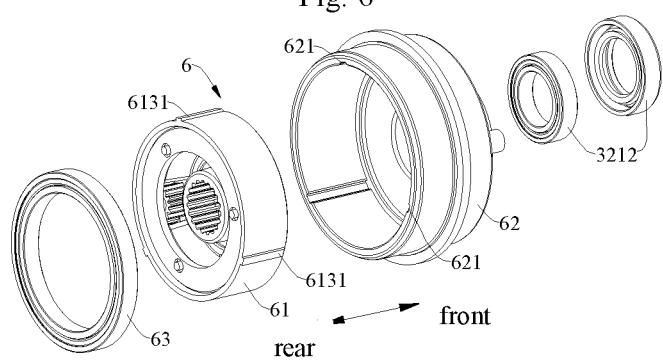
FIG. 7 is an exploded view of the planetary gear assembly of the drum washing machine.
Figure 11:
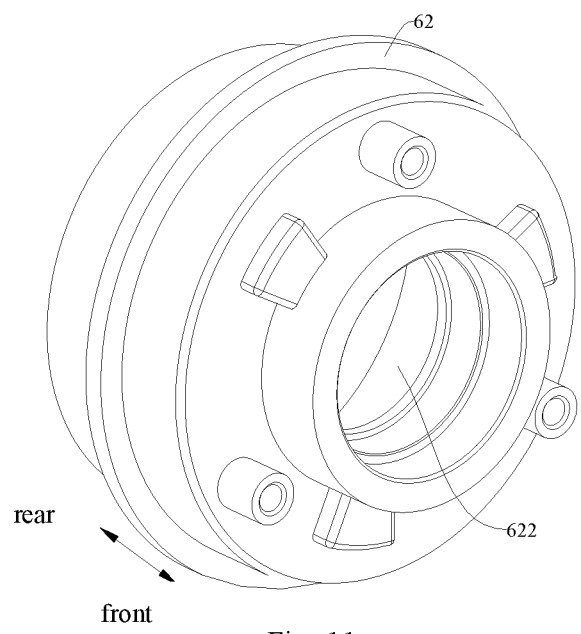
FIG. 11 is a schematic view of a planetary gear casing shown in FIG. 7.

As shown in FIGS. 7, 8, and 11, according to a further embodiment of the present disclosure, the planetary gear assembly 6 further includes: a planetary gear casing 62 which is provided therein with the planetary gear component 61 to implement the modular design of the planetary gear assembly 6. The planetary gear outer teeth casing 613 is in transmission connection with the agitator 4 via the planetary gear casing 62. For example, the planetary gear casing 62 and the agitator 4 may be combined by screws, and the planetary gear outer teeth casing 613, the planetary gear casing 62 and the agitator 4 are fixedly connected to realize synchronous operation and facilitate the planetary gear assembly 6 to transmit the torque of the main shaft 31 to the agitator 4.

In some examples, one of an inner peripheral wall of the planetary gear casing 62 and an outer peripheral wall of the planetary gear outer teeth casing 613 is provided with a flange 6131, the other of the inner peripheral wall of the planetary gear casing 62 and the outer peripheral wall of the planetary gear outer teeth casing 613 is provided with a latching slot 621, and the flange 6131 is fitted in the latching slot 621 to ensure a fixed connection between the planetary gear casing 62 and the planetary gear outer teeth casing 613.

In some examples, the outer peripheral wall of the planetary gear outer teeth casing 613 is provided with a plurality of flanges 6131, each of the flanges 6131 extends in the axial direction of the planetary gear outer teeth casing 613, and the plurality of flanges 6131 are arranged at intervals in the circumferential direction of the planetary gear outer teeth casing 613.

Correspondingly, the inner peripheral wall of the planetary gear casing 62 is provided with a plurality of latching slots 621. Each of the latching slots 621 extends in the axial direction of the planetary gear casing 62, and the plurality of latching slots 621 are arranged at intervals in the circumferential direction of the planetary gear casing 62. The plurality of flanges 6131 are fitted in the plurality of latching slots 621 in one-to-one correspondence, which not only implement the connection between the planetary gear outer teeth casing 613 and the planetary gear casing 62, but also ensure the circumferential positioning of the planetary gear outer teeth casing 613 and the planetary gear casing 62, and realize the synchronous operation of the planetary gear outer teeth casing 613 and the planetary gear casing 62.

It will be appreciated that the positions of the plurality of flanges 6131 and the positions of the plurality of latching slots 621 are interchangeable, e.g., the plurality of flanges 6131 are all provided at the inner circumferential wall of the planetary gear casing 62, and the plurality of latching slots 621 are all provided at the outer peripheral wall of the planetary gear outer teeth casing 613, or some of the plurality of flanges 6131 are provided on the outer peripheral wall of the planetary gear outer teeth casing 613, and some other of the plurality of flanges 6131 are provided on the inner peripheral wall of the planetary gear casing 62, and the plurality of latching slots 621 are also provided correspondingly at the outer peripheral wall of the planetary gear outer teeth casing 613 and the inner peripheral wall of the planetary gear casing 62 respectively, for convenient connection.

Figure 21:
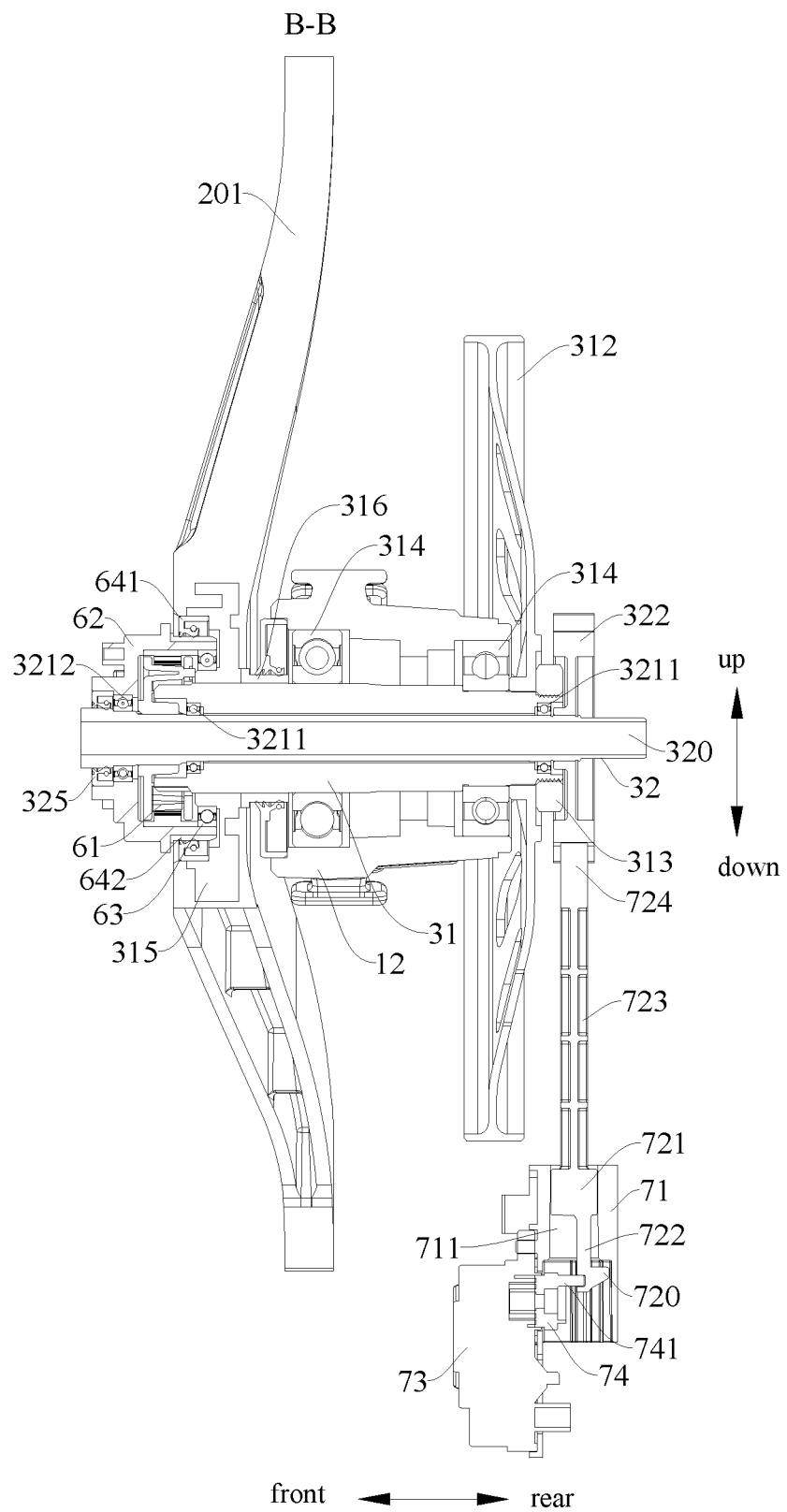
FIG. 21 is a sectional view taken along line B-B in FIG. 19.
Figure 23:
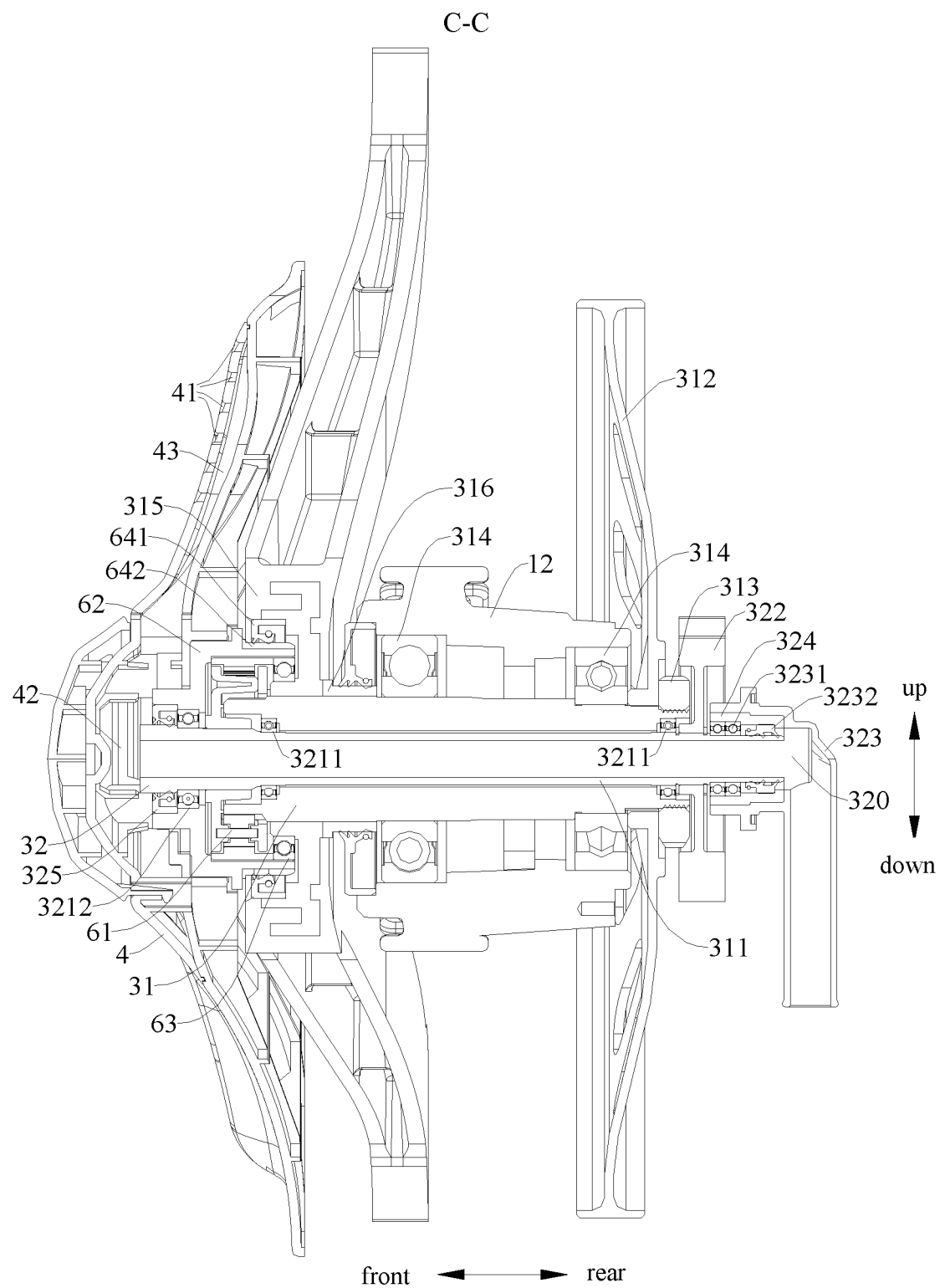
FIG. 23 is a sectional view taken along line C-C in FIG. 22

As shown in FIG. 7, in conjunction with FIGS. 1, 21 and 23, according to a still further embodiment of the present disclosure, the planetary gear assembly 6 further includes: a planetary gear bearing 63 provided in the planetary gear casing 62 and located on the outer side of the planetary gear component 61, an inner ring of the planetary gear bearing 63 is fitted over the main shaft 31 and rotates with the main shaft 31, an outer ring of the planetary gear bearing 63 is connected to the planetary gear casing 62 and rotates with the planetary gear casing 62, and by providing the planetary gear bearing 63, it is ensured that the planetary gear casing 62 rotates relative to the main shaft 31.

In one embodiment, an inner peripheral surface of the planet carrier 611 is provided with meshing teeth that mesh with a second shaft 32 in the main shaft 31. Therefore, the planet carrier 611 is fixedly mounted to the second shaft 32 to synchronously rotate with the second shaft 32.

In some examples, the second shaft 32 is supported by a second shaft bearing 3211 fitted over thereon and provided in the cavity 311. In one embodiment, at least two second shaft bearings 3211 are provided in the cavity 311 of the main shaft 31, and the second shaft 32 passes through the at least two second shaft bearings 3211 to be supported in the cavity 311 of the main shaft 31 and to be rotatable with respect to the main shaft 31.

In some examples, the planetary gear assembly 6 further includes a second shaft end bearing 3212. The planetary gear casing 62 is provided with a through hole 622, the second shaft 32 passes through the through hole 622, and the second shaft 32 is supported by a second shaft end bearing 3212 fitted thereon and provided in the through hole 622. Thus, one end of the planetary gear casing 62 is supported on the second shaft 32 by the second shaft end bearing 3212, and the other end of the planetary gear casing 62 is supported on the main shaft 31 by the planetary gear bearing 63, which not only positions and mounts the planetary gear assembly 6, but also ensure the rotation of the planetary gear casing 62 relative to the second shaft 32 and the main shaft 31.

In some examples, the planetary gear assembly 6 further includes a shaft sealing member 325, the shaft sealing member 325 is located in the through hole 622 and at an outer side of the second shaft end bearing 3212. The shaft sealing member 325 is configured to seal a gap between the second shaft 32 and the planetary gear casing 62.

In one embodiment, the shaft sealing member 325 is fitted over the second shaft 32, and is provided on the second shaft 32 and located at an outer side of the second shaft end bearing 3212. That is, the shaft sealing member 325 is further away from the axial center of the second shaft 32 compared with the second shaft end bearing 3212, and the shaft sealing member 325 seals the gap between the second shaft 32 and the planetary gear casing 62, which prevents water in the water supply passage 320 of the second shaft 32 from entering the cavity 311 of the main shaft 31 and the planetary gear assembly 6 through the gap between the second shaft 32 and the planetary gear casing 62.

The drum washing machine 100 according to embodiments of the present disclosure includes the planetary gear assembly 6 for a drum washing machine.

Since the planetary gear assembly 6 for a drum washing machine according to embodiments of the present disclosure brings about the above benefits, i.e. by providing the planetary gear assembly 6 between the main shaft 31 and the agitator 4, the torque of the main shaft 31 can be transmitted to the agitator 4 to drive the agitator 4 to rotate, the rotation of the agitator 4 may be combined with the rotation of the drum 2 into various washing modes, to diversify the washing mode of the drum washing machine 100.

Moreover, the torque of the main shaft 31 is transmitted to the agitator by the planetary gear assembly 6, and the agitator 4 is driven by the driver indirectly. Since the load of the agitator 4 is much less than the load of the drum 2, compared with the drum washing machine with an impeller in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

Some embodiments of the drum washing machine 100 according to the present disclosure will be described in detail below with reference to FIGS. 1 to 23.

As shown in FIGS. 1 to 23, the drum washing machine 100 according to embodiments of the present disclosure includes a tub 1, a drum 2, an agitator 4, a driver (such as an electric motor 5 described below), and a planetary gear assembly 6.

The drum 2 is rotatably provided in the tub 1. The agitator 4 is rotatably provided in the drum 2. The driver is in transmission connection with the drum 2 via a main shaft 31 which transmits a torque of the driver to the drum 2. The planetary gear assembly 6 is in transmission connection with the main shaft 31 and the agitator 4 separately. When the driver drives the main shaft 31 to rotate, the planetary gear assembly 6 may transmit the torque of the main shaft 31 to the agitator 4, to drive the agitator 4 to rotate.

In the drum washing machine 100 according to the embodiment of the present disclosure, by providing the driver and driving the main shaft 31 to rotate to drive the drum 2 to rotate using the driver, and further providing the agitator 4 in the drum 2, and transmitting the torque of the main shaft 31 to the agitator 4 using the planetary gear assembly 6 to drive the agitator 4 to rotate, the rotation of the agitator 4 may be combined with the rotation of the drum 2 into various washing modes, for example, only one of the agitator 4 and the drum 2 is rotated or the agitator 4 and the drum 2 are rotated at the same time, or in the same direction or in opposite directions to diversify the washing mode of the drum washing machine 100.

Moreover, the driver drives the drum 2 via the main shaft 31, to directly drive a component with a relatively large load using the driver, the number of levels of power transmission is less, and the power transmission is more direct, to stably drive the drum which is large in volume and required to accommodate laundry and water. The planetary gear assembly 6 is provided between the main shaft 31 and the agitator 4, and the torque of the main shaft 31 is transmitted to the agitator by the planetary gear assembly 6 to indirectly drive the agitator 4 using the driver. Since the load of the agitator 4 is much less than the load of the drum 2, compared with the drum washing machine with an impeller (agitator) in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

Therefore, the drum washing machine 100 according to the embodiment of the present disclosure may implement various washing modes, and has the advantages of stable performance, long service life, or the like.

The planetary gear assembly 6 of the drum washing machine 100 according to an embodiment of the present disclosure is switchable between a first state and a second state.

The planetary gear assembly 6 in the first state transmits the torque of the main shaft 31 to the agitator 4 in the same direction, to rotate the agitator 4 and the drum 2 in the same direction. The planetary gear assembly 6 in the second state transmits the torque of the main shaft 31 to the agitator 4 in an opposite direction, to rotate the agitator 4 and the drum 2 in opposite directions. For example, if the driver drives the main shaft 31 to rotate clockwise, the planetary gear assembly 6 in the first state transmits the torque of the main shaft 31 to the agitator 4 in the same direction, to rotate the agitator 4 and the drum 2 clockwise. The planetary gear assembly 6 in the second state transmits the torque of the main shaft 31 to the agitator 4 in an opposite direction, to rotate the agitator 4 counterclockwise.

For example, when the drum washing machine 100 is in a spin mode, the planetary gear assembly 6 is switchable to the first state, and the agitator 4 and the drum 2 are driven to rotate in the same direction by the mode of power transmission of the planetary gear assembly 6 in the first state, ensuring that the laundry will not be entangled or torn when spinning at a high speed.

When the drum washing machine 100 is in a wash mode, the planetary gear assembly 6 is switchable to the second state, and the agitator 4 and the drum 2 are driven to rotate in opposite directions by the mode of power transmission of the planetary gear assembly 6 in the second state, to agitate the laundry and water thoroughly to improve the effect of cleaning the laundry.

In one embodiment, the combination of the state switching of the planetary gear assembly 6 and the current mode of the drum washing machine 100 is not limited to the above-mentioned embodiments, and the first and second states of the planetary gear assembly 6 may also be combined with any one of the spin and wash modes.

Thus, by providing the planetary gear assembly 6 which is switchable between the first and second states, the rotation direction of the agitator 4 is adjustable, and the agitator 4 and the drum 2 are rotated in the same direction and in opposite directions, to cooperate with the drum 2 to form operating modes suitable for different operating conditions.

In some examples, when the agitator 4 and the drum 2 are rotated in opposite directions, the rotational speed of the agitator 4 is less than the rotational speed of the drum 2. That is, when the planetary gear assembly 6 is in the second state, the variable-speed transmission of power is implemented. Thus, when the laundry and the water are sufficiently agitated, the laundry is prevented from being entangled, and the stability and noise reduction of the whole machine are contributed.

In some examples, when the agitator 4 and the drum are rotated in the same direction, the rotational speed of the agitator 4 is equal to the rotational speed of the drum 2. That is, when the planetary gear assembly 6 is in the first state, the agitator 4 is rotated in synchronization with the drum 2 (at the same speed and in the same direction).

As shown in FIGS. 6-11, according to an embodiment of the present disclosure, the planetary gear component 6 includes a planetary gear component 61 and the planetary gear component 61 includes a planet carrier 611, a plurality of planetary gears 612, and a planetary gear outer teeth casing 613.

The plurality of planetary gears 612 are rotatably mounted to the planet carrier 611 respectively, and an outer peripheral wall of the main shaft 31 has meshing teeth, and the plurality of planetary gears 612 are meshed with the meshing teeth on the main shaft 31 respectively. The planetary gear outer teeth casing 613 is fitted over the plurality of planetary gears 612, and the planetary gear outer teeth casing 613s meshes with the plurality of planetary gears 612 respectively, and the planetary gear outer teeth casing 613s is in transmission connection with the agitator 4.

It is understood that the inner peripheral wall of the outer casing 613 of the planetary gear has meshing teeth that mesh with the plurality of planetary gears 612. Thus, the main shaft 31, the plurality of planetary gears 612, the planet carrier 611, the planetary gear outer teeth casing 613 constitute a planetary gear train, and the shaft section of the main shaft 31 meshing with the plurality of planetary gears 612 forms a sun gear of the planetary gear train.

When the planet carrier 611 is allowed to rotate freely, the planetary gear assembly 6 is in the first state, and the agitator 4 and the drum 2 are rotated in the same direction; when the planet carrier 611 is braked, the planetary gear assembly 6 is in the second state, the plurality of planetary gears 612 are rotated respectively, and the outer casing 613 of the planetary gear and the main shaft 31 are rotated in opposite directions, to rotate the agitator 4 and the drum 2 in opposite directions. Thus, by switching the state of the planet carrier 611 of the planetary gear assembly 6, the operating mode of the agitator 4 is controllable and the drum washing machine 100 is switchable among various operating modes.

Thus, according to the drum washing machine 100 of the embodiment of the present disclosure, by providing planetary gear assembly 6 between the main shaft 31 and the agitator 4, and transmitting the torque of the main shaft 31 to the agitator 4 using the planetary gear assembly 6 to drive the agitator 4 to rotate, the rotation of the agitator 4 may be combined with the rotation of the drum 2 into various washing modes, for example, only one of the agitator 4 and the drum 2 is rotated or the agitator 4 and the drum 2 are rotated at the same time, or in the same direction or in opposite directions, to diversify the washing mode of the drum washing machine 100.

Moreover, the torque of the main shaft 31 is transmitted to the agitator 4 by the planetary gear assembly 6, and the agitator 4 is driven by the driver indirectly. Since the load of the agitator 4 is much less than the load of the drum 2, compared with the drum washing machine with an impeller (agitator) in the related art, the load acting on the planetary gear assembly 6 is greatly reduced, which not only facilitates stable power transmission to improve the performance stability of the drum washing machine 100, but also greatly reduces the risk of damage to the planetary gear assembly 6 to prolong the service life of the drum washing machine 100.

According to an embodiment of the present disclosure, the drum washing machine 100 further includes a second shaft 32 and a brake 7, and the second shaft 32 meshes with the planet carrier 611, and the brake 7 controls whether the planet carrier 611 is braked through the second shaft 32.

In some examples, the side peripheral wall of the second shaft 32 is provided with a spline. That is, the second shaft 32 forms a spline shaft, and the planet carrier 611 is provided with a spline groove engaged with the spline of the second shaft 32, and the second shaft 32 is fixedly connected with the planet carrier 611 through the engagement of the spline and the spline groove to ensure the synchronous operation of the second shaft 32 and the planet carrier 611.

When the brake 7 brakes the second shaft 32, the planet carrier 611 is braked and unable be rotated; when the brake 7 is disengaged from the second shaft 32, the planet carrier 611 is in a free state. Therefore, by providing the brake 7, the operating state of the second shaft 32 is switchable, to switch the planetary gear assembly 6 between the first and second states. The planetary gear assembly 6 switched between the first and second states may adjust the rotation direction of the agitator 4 to rotate the agitator 4 and the drum 2 in the same direction and in opposite directions, to cooperate with the drum 2 to form operating modes suitable for different operating conditions.

In some examples, the main shaft 31 has a cavity 311 extending there through in the axial direction thereof, and the second shaft 32 passes through the cavity 311. For example, a central axis of the main shaft 31 is parallel to and coincident with a central axis of the second shaft 32, and the main shaft 31 is rotatable relative to the second shaft 32, to drive the drum 2 and the agitator 4 to rotate respectively to ensure the normal operation of the drum washing machine 100.

As shown in FIGS. 12 to 21, in some examples, a brake disk 322 is in transmission connection with the second shaft 32. When the brake 7 is fitted with the brake disk 322, the second shaft 32 is braked, to realize the braking of the planet carrier 611. When the brake 7 is disengaged from the second shaft 32, the second shaft and the planet carrier 611 are in a free state.

Furthermore, as shown in FIGS. 13 to 16, the brake 7 includes: a sliding groove seat 71, a brake lever 72, and a brake driver 73. The sliding groove seat 71 is provided with a slideway 711. The brake lever 72 is slidingly fitted with the slideway 711 between an extending position and a retracting position. The brake lever 72 is engaged with the brake disk 322 in the extending position and disengaged from the brake disk 322 in the retracting position. The brake driver 73 is mounted to the sliding groove seat 71 and is in transmission connection with the brake lever 72, and the brake driver 73 drives the brake lever 72 to move between the extending position and the retracting position. Thus, by the brake driver 73 driving the brake lever 72 to move along the slideway 711, the brake lever 72 is engaged with and disengaged from the brake disk 322 and the switching is convenient.

In the brake 7 for a drum washing machine according to the embodiment of the present disclosure, the brake driver 73 drives the brake lever 72 to move between the extending position and the retracting position. By utilizing the brake lever 72 to be engaged with and disengaged from the brake disk 322 on the second shaft 32 of the drum washing machine 100, the second shaft 32 is switched between the free state and the braking state, and then the torque of the main shaft 31 is transmitted to the agitator 4 through the planetary gear assembly 6 to drive the agitator 4 to rotate. Thus, the rotation of the agitator 4 may be combined with the rotation of the drum 2 into various washing modes to diversify the washing mode of the drum washing machine 100.

Moreover, the brake 7 has a small number of parts and a simpler structure. The brake driver 73 drives the brake lever 72 to move, the second shaft 32 is switched to the braking state by utilizing the brake lever 72 to be engaged with the brake disk 322 in the extending position, and the second shaft 32 is switched to the free state by utilizing the brake lever 72 to be disengaged from the brake disk 322 in the retracting position. Therefore, compared with the drum washing machine with an impeller in the related art, the brake lever 72 directly acts on the brake disk 322 on the second shaft 32, which facilitates control. Due to a small number of transmission structures between the brake lever 72 and the second shaft 32, power transmission is more direct, an operating state of the second shaft 32 may be stably switched, which facilitates stable transmission of power to improve the performance stability of the drum washing machine 100.

Therefore, the brake 7 for a drum washing machine according to the embodiment of the present disclosure to switch a mode of the agitator 4 collaborative with the drum 2 and has the advantages of a simple structure, convenient control, stabilization, or the like.

In some examples, the brake lever 72 is provided with a limiting block 720, and a limiting boss 712 is arranged in the slideway 711. By arranging the limiting boss 712 in the slideway 711, the limiting boss 712 is fitted with the limiting block 720 on the brake lever 72, a moving path of the brake lever 72 is limited. That is, the brake lever 72 may be axially limited, which prevents the brake lever 72 from sliding out of the slideway 711 to be detached from the sliding groove seat 71, thus further ensuring the operating reliability of the brake lever 72.

In some examples, a circumferentially positioned sliding groove 713 is provided in the slideway 711, and the limiting block 720 is slidably fitted with the circumferentially positioned sliding groove 713. By arranging the circumferentially positioned sliding groove 713 in the slideway 711, the limiting block 720 moves in the circumferentially positioned sliding groove 713 when the brake lever 72 moves along the slideway 711, and the circumferentially positioned sliding groove 713 may circumferentially position the brake lever 72, realizing anti-rotation effect.

Figures 15, 16:
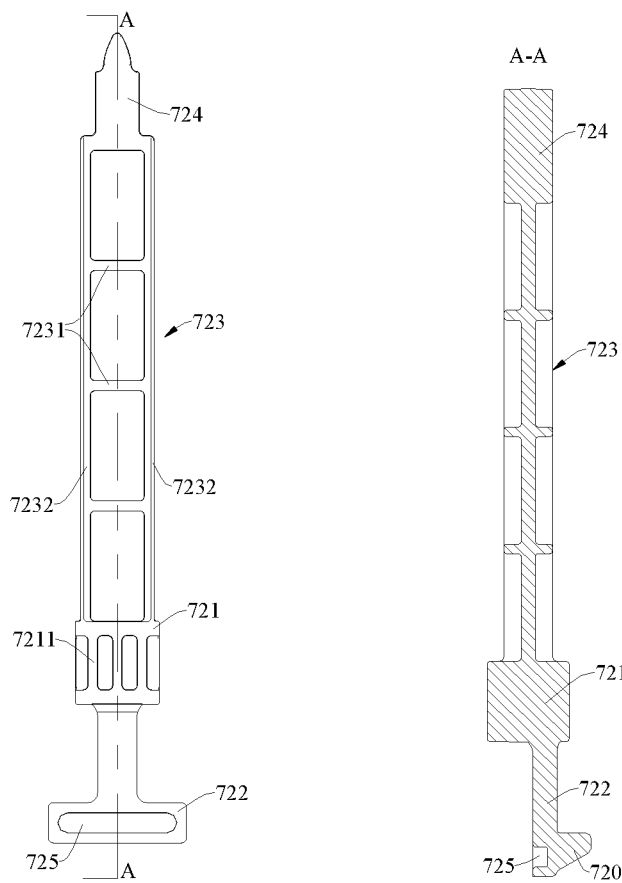
FIG. 15 is a schematic view of a brake lever shown in FIG. 12.
FIG. 16 is a sectional view taken along line A-A in FIG. 15.
Figure 17:
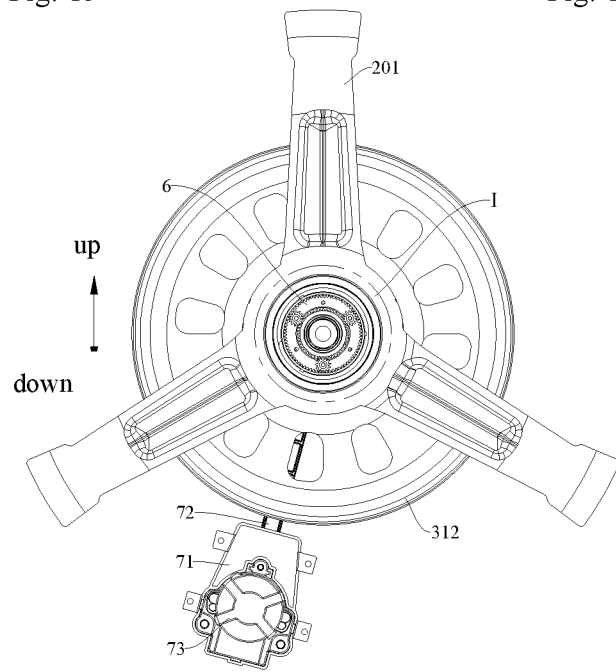
FIG. 17 is a schematic view of a drum washing machine viewed from the front to the rear, with a cabinet, drum and agitator removed.

As shown in FIGS. 15 and 16, in some examples, the brake lever 72 includes: a slideway fitting portion 721, a transmission portion 722, a bridge portion, and a brake portion 724.

The slideway fitting portion 721 is slidably fitted with the slideway 711, and the transmission portion 722 is connected to a first end of the slideway fitting portion 721 while the bridge portion 723 is connected to a second end of the slideway fitting portion 721. That is, both ends of the slideway fitting portion 721 are connected to the transmission portion 722 and the bridge portion 723 respectively. The brake portion is connected to an end of the bridge portion away from the slideway fitting portion 721, and the transmission portion 722 is in transmission connection with the brake driver 73, to drive the brake lever 72 to move by driver. The brake portion 724 is engaged with the brake disk 322 when the brake lever 72 is in the extending position, while the brake portion 724 is disengaged from the brake disk 322 when the brake lever 72 is in the retracting position. The brake lever 72 has a simple structure and its connection with the sliding groove seat 71 and the brake driver is convenient.

In some examples, a cross-section of the slideway fitting portion 721 and a minimum cross-section of the slideway 711 are mutually matched circles. A cross-section of the bridge portion 723 is rectangular and its area is smaller than that of the slideway fitting portion 721.

That is to say, the cross-sectional area of the bridge portion 723 is smaller than the minimum cross-sectional area of the slideway 711, which may reduce a fitting area between an inner wall surface of the slideway 711 and the brake lever 72, to reduce frictional force between the brake lever 72 and the sliding inner wall surface, and further reducing moving resistance to the brake lever 72.

In some examples, the bridge portion 723 is provided with a plurality of transverse reinforcing ribs 7231 and a plurality of longitudinal reinforcing ribs 7232. Each transverse reinforcing rib 7231 extends along a width direction of the bridge portion 723 and the plurality of transverse reinforcing ribs 7231 are spaced apart from each other along a length direction of the bridge portion 723. Each longitudinal reinforcing rib 7232 extends along a length direction of the bridge portion 723 and the plurality of longitudinal reinforcing ribs 7232 are spaced apart from each other along a width direction of the bridge portion 723. Each longitudinal reinforcing rib 7232 is connected to the plurality of transverse reinforcing ribs 7231 respectively. By arranging the plurality of transverse reinforcing ribs 7231 and the plurality of longitudinal reinforcing ribs 7232 on the bridge portion 723, the structural strength of the bridge portion 723 is improved, and the service reliability of the brake 7 is ensured, thus prolonging service life of the brake 7.

In some examples, the slideway fitting portion 721 is provided with a plurality of axial reinforcing ribs 7211. Each of the axial reinforcing ribs extends along an axial direction of the slideway fitting portion 721 and the plurality of the axial reinforcing ribs 7211 are spaced apart from each other along a circumferential direction of the slideway fitting portion 721, to improve the structural strength of the slideway fitting portion and further ensuring the service reliability of the brake 7.

Figure 13:
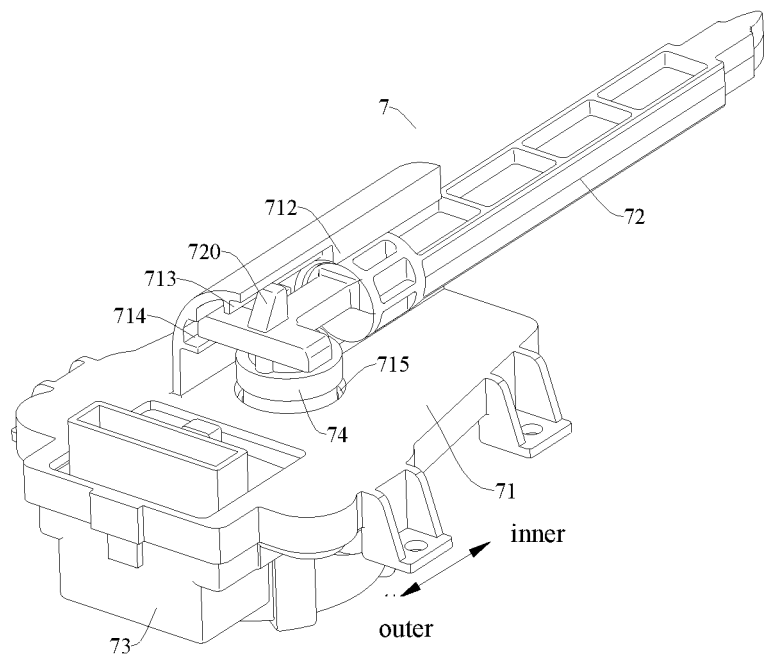
FIG. 13 is a schematic view of a brake shown in FIG. 12.
Figure 14:
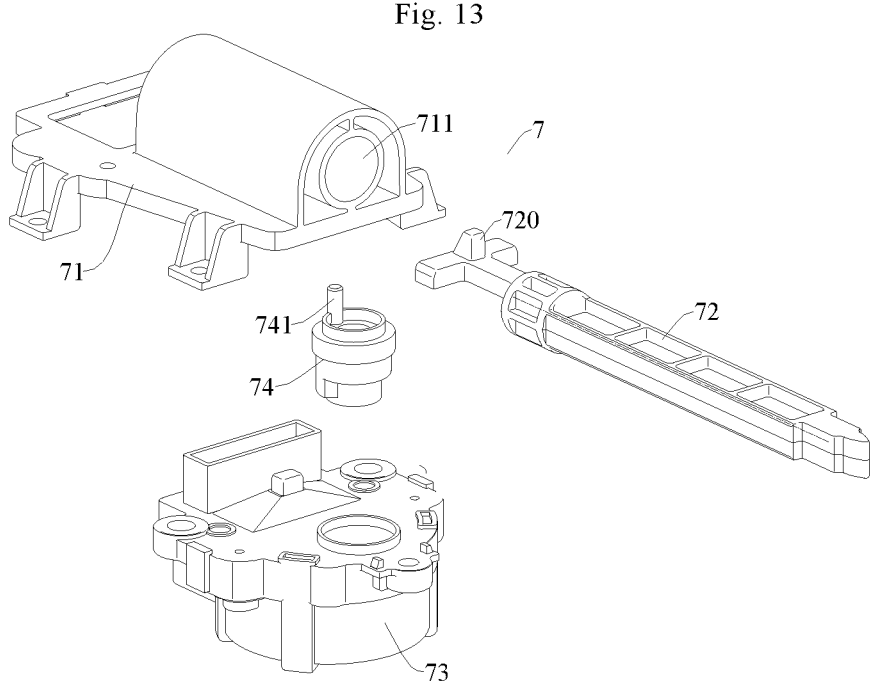
FIG. 14 is an exploded view of a brake shown in FIG. 12.

As shown in FIG. 13, in some examples, a support sliding groove 714 is arranged in the slideway 711, and the transmission portion 722 is slidably supported on the support sliding portion 714.

In some examples, at least two support ribs protruding from an inner surface of the slideway 711 are arranged in the slideway 711, and each of the support ribs extends along the length direction of the slideway 711. A support sliding groove 714 is defined between adjacent support ribs, and the transmission portion 722 is supported on the support ribs and movable along the support sliding groove 714. Therefore, by arranging the supporting sliding portion 714 in the slideway 711, not only the transmission portion 722 may be supported and positioned to realize the anti-rotation effect, but also a slidingly fitting reliability between the brake lever 72 and the sliding groove seat 71 may be improved, which ensures normal operation of the driver.

According to another embodiment of the present disclosure, the brake 7 further includes: a brake cam 74. The driver is configured as an electric motor and is in transmission connected with the brake lever 72 via the brake cam 74, and the brake cam 74 may convert a rotational motion of the electric motor shaft of the electric motor into a linear motion of the brake lever 72 in the slideway 711 to ensure the normal operation of the brake 7.

In some examples, the brake cam 74 is provided with an eccentric column 741, the brake lever 72 is provided with a straight sliding groove 725, and the eccentric column 741 is in a sliding fit in the straight sliding groove 725. When the electric motor drives the brake cam 74 to rotate, the eccentric column 741 of the brake cam 74 is eccentrically rotated, and since the slideway 711 limits the brake lever 72 to only move linearly in its length direction, when the eccentric column 741 slides in the straight sliding groove 725, the brake lever 72 is driven to move in the length direction of the slideway 711, with continuous operating actions, and high use reliability.

In one embodiment, a length direction of the transmission portion 722 is perpendicular to a length direction of the bridge portion 723 and the slideway fitting portion 721. The straight sliding groove 725 is arranged on the transmission portion 722 of the brake lever 72 and extends along a length direction of the transmission portion 722, and a length direction of the straight sliding groove 725 is perpendicular to a linear motion direction of the brake lever 72 and the structure is simple and compact, which is convenient for fitting with the brake cam 74, to realize the above functions.

In some examples, the sliding groove seat 71 is provided with a via hole 715 in communication with the slideway 711, a part of the brake cam 74 is arranged in the via hole 715 to be connected to the brake driver 73, and another part of the brake cam 74 extends into the slideway 711 through the via hole 715, to facilitate the eccentric column 741 of the brake cam 74 to cooperate with the straight sliding groove 725 of the brake lever 72.

Figure 12:
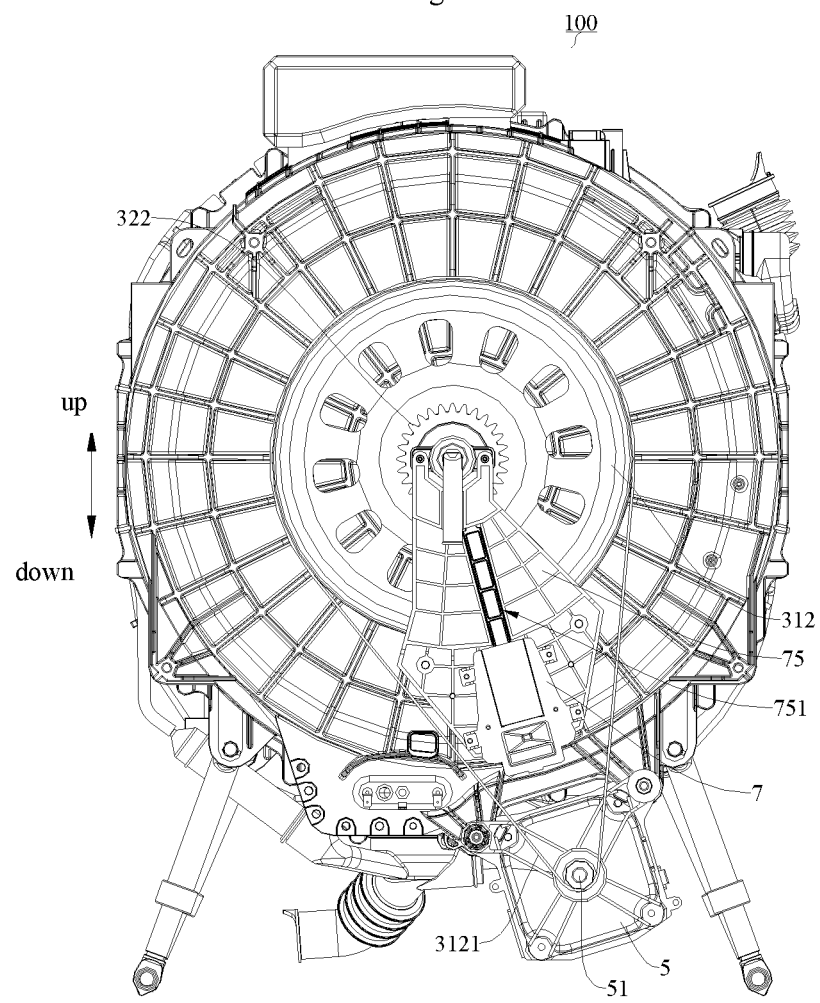
FIG. 12 is a rear view of a local structure of a drum washing machine according to an embodiment of the present disclosure.

As shown in FIG. 12, in some examples, the sliding groove seat 71 is mounted on a rear wall of the tub 1 through the brake support 75. The brake disk 322 is located on an outside of the tub 1 and is mounted on an end of the second shaft 32 extending out of the tub 1, and the brake 7 is located on an outside of the tub 1, to cooperate with the brake disk 322 to switch to different working modes of the drum washing machine 100.

A side circumferential wall of the brake disk 322 has locking teeth arranged along its circumferential direction, and the brake lever 72 of the brake 7 may be slidable between the extending position and the retracting position. The brake lever 72 abuts between two adjacent locking teeth of the brake disk 322 in the extending position, and the brake lever 72 is disengaged from the brake disk 322 is in the retracting position.

In some examples, the brake support 75 is provided with a limiting sliding groove 751 extending along an axial direction of the brake disk 322. A portion of the brake lever 72 extending out of the slideway 711 is slidably fitted in the limiting sliding groove 751, and the limiting sliding groove 751 limits the brake lever 72, which is used only used for guiding, but also ensures linear movement of the brake lever 72 to prevent the brake lever 72 from being broken during movement.

According to another embodiment of the disclosure, the drum washing machine 100 further includes: a detector (not shown) for detecting power of the driver. When the detector detects that the power of the driver reaches a predetermined value, the brake 7 controls whether the planet carrier 611 is allowed to rotate freely through the second shaft 32, and the agitator 4 and the drum 2 are rotated in the same direction, and the laundry in the drum 2 is prevented from being entangled severely and torn, with high safety.

Figure 2:
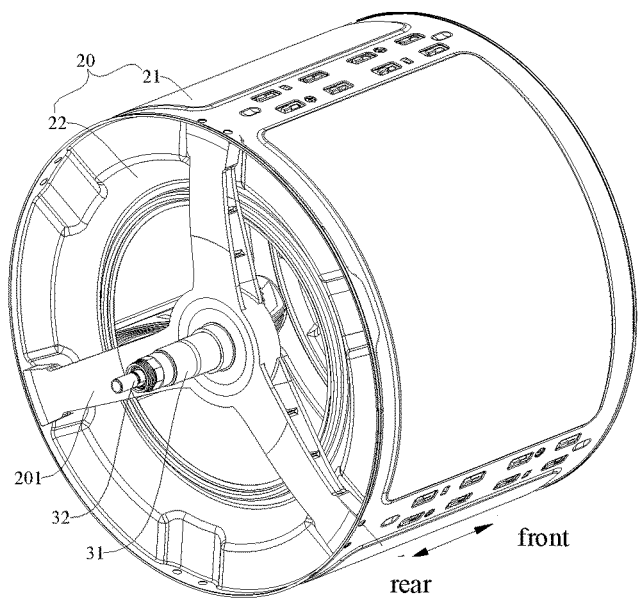
FIG. 2 is a schematic view of a drum of a drum washing machine mounted on a drum support.
Figure 3:
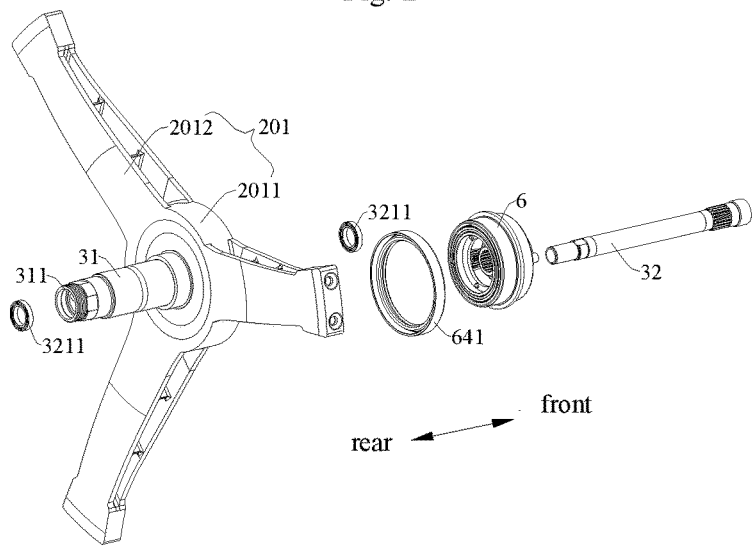

As shown in FIGS. 1-3, according to an embodiment of the present disclosure, the drum washing machine 100 further includes a drum support 201 mounted to a rear wall of the drum 2 and located between the rear wall of the drum 2 and the rear wall of the tub 1, and the main shaft 31 is rotatably connected with the drum 2 via the drum support 201 and rotatably supported at the rear wall of the tub 1. That is, the main shaft 31 may directly drive the drum 2 to rotate, and at the same time, the agitator 4 may be rotated by the planetary gear assembly 6, and the planetary gear assembly 6 is not easily damaged.

In one embodiment, the drum 2 includes a drum body 21 with two open axial ends and a rear cover 22 of the drum provided at a rear end of the drum body 21. An outer periphery of the rear cover 22 of the drum is formed as a folded edge extending in an axial direction of the drum body 21. The rear end of the drum body 21 is connected with the folded edge of the rear cover 22 of the drum. A drum support 201 is fixed at the joint of the drum body 21 and the folded edge of the rear cover 22 of the drum by a connecting member (for example, a screw), to fix the drum 2 onto the drum support 201, and the drum 2 is rotatable with the drum support 201 relative to the tub 1.

In some examples, the drum support 201 has a central shaft portion 2011 and a support portion 2012, and the central shaft portion 2011 extends in the axial direction of the tub 1 and is rotatably supported on the rear wall of the tub 1, the support portion 2012 is connected to the side peripheral wall of the central shaft portion 2011, and the drum 2 is mounted to the support portion 2012.

In one embodiment, the support portion 2012 of the drum support 201 includes a plurality of (for example, three) connecting arms distributed in the circumferential direction of the drum 2, each of the connecting arms extends in the radial direction of the drum 2, and an inner end of each of the connecting arms is connected with the side peripheral wall of the central shaft portion 2011, and an outer end of each of the connecting arms is connected with the drum 2 through a connecting member. The drum 2 is connected by using the plurality of connecting arms, which not only guarantees the reliability and stability of connection between the drum support 201 and the drum 2, but also reduces a material utilization amount of the drum support 201 and lowers material costs and weight, to improve the cost performance of the drum washing machine 100. It is understood that the support portion 2012 and the central shaft portion 2011 may be integrally formed.

In some examples, the rear wall of the tub 1 is provided with a mounting hole 11, the mounting hole 11 is provided therein with a main shaft bearing seat 12, and the main shaft 31 is rotatably supported by the main shaft bearing 314 provided in the main shaft bearing seat 12. That is, the main shaft bearing seat 12 and the main shaft bearing 314 mounted in the main shaft bearing seat 12 are provided in the mounting hole 11, the main shaft 31 extends into the mounting hole 11 in the axial direction of the mounting hole 11 and is mounted to the rear wall of the tub 1 by the main shaft bearing 314, and thus, the main shaft 31 is rotatable relative to the tub 1.

Figure 4:
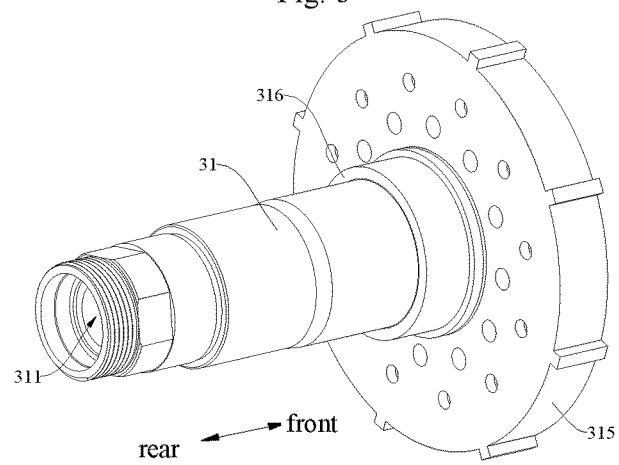
FIG. 4 is an assembly view of a main shaft, a main shaft sleeve and a main shaft flange of the drum washing machine.
Figure 5:
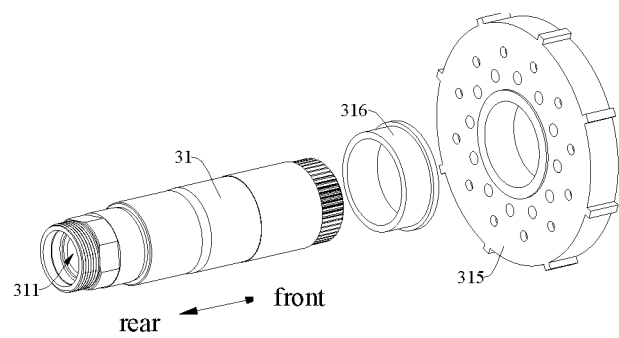
FIG. 5 is an exploded view of the structure shown in FIG. 4.
Figure 6:
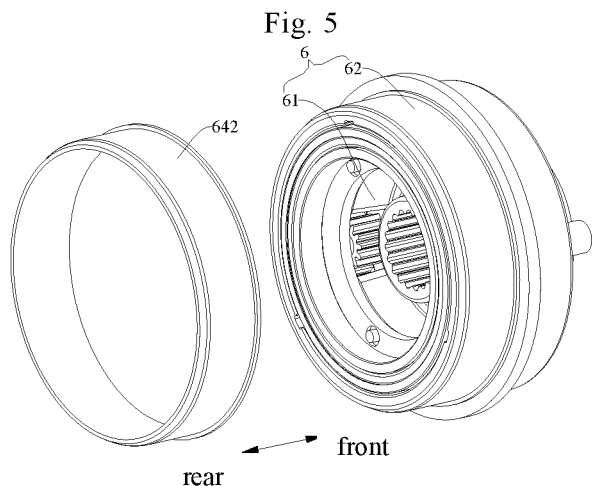
FIG. 6 is a schematic view of a planetary gear assembly and a wear sleeve of the drum washing machine.

Referring to FIGS. 4 and 5, and in conjunction with FIGS. 1, 21 and 23, in some examples, a main shaft sleeve 316 is fitted over the main shaft 31, a main shaft flange 315 is fitted over the main shaft sleeve 316, and the drum support 201 is connected to the main shaft flange 315, with convenient and reliable connection.

In one embodiment, the main shaft sleeve 316 is fitted over the main shaft 31, the main shaft flange 315 is fitted over the main shaft sleeve 316, and the drum support 201 is cast on the main shaft flange 315. For example, the drum support 201 may be a cast aluminum part. The main shaft 31, the main shaft sleeve 316 and the main shaft flange 315 may be integrally formed by machine work, which is advantageous for improving the production efficiency of the drum washing machine 100.

In some examples, an assembly sealing member 641 is fitted over the planetary gear assembly 6 to seal a gap between the planetary gear assembly 6 and the main shaft flange 315, to guarantee the sealed connection between the planetary gear assembly 6 and the main shaft flange 315.

Furthermore, the outer peripheral wall of the planetary gear assembly 6 is provided with an annular limiting ring, the wear sleeve 642 is fitted over the planetary gear assembly 6 and one end is abutted against the annular limiting ring, the wear sleeve 642 is located between the planetary gear assembly 6 and the assembly sealing member 641, the assembly sealing member 641 is formed in a ring shape and fitted over the wear sleeve 642, an inner surface of the assembly sealing member 641 is hermetically connected with the wear sleeve 642, and an outer surface of the assembly sealing member 641 is hermetically connected with the main shaft flange 315 and the drum support 201 respectively. By providing the wear sleeve 642 between the assembly sealing member 641 and the planetary gear assembly 6, the wear sleeve 642 is engaged with the assembly sealing member 641 to guarantee dimensional accuracy and improve wear resistance.

As shown in FIG. 12, according to an embodiment of the present disclosure, the main shaft 31 is in transmission connection with a pulley 312, the driver is configured as an electric motor 5, and the electric motor 5 drives the pulley 312 to rotate by a belt 3121 tensioned on the pulley 312, i.e., the belt 312 is wound on the electric motor shaft 51 and the pulley 312. Thus, by providing the pulley 312 and the belt 3121 on the main shaft 31, the transmission connection between the main shaft 31 and the driver is realized by the belt 3121, which cushions impact and attenuates vibration load, smooths the operation of the main shaft 31, and reduces the noise generated during operation.

In some examples, the pulley 312, the belt 3112 and the driver are all located outside the tub 1, and the pulley 312 is stopped between the rear wall of the tub 1 and a lock nut 313 on the main shaft 31. That is, the pulley 312 is fixedly connected to the main shaft 31 and located between the rear wall of the tub 1 and the lock nut 313. By providing the lock nut 313, the pulley 312 may be positioned and mounted, and the driver drives the pulley 312 to rotate through the belt 3121, and the pulley 312 drives the main shaft 31 to rotate, to achieve synchronous rotation of the pulley 312 with the main shaft 31.

Figure 22:
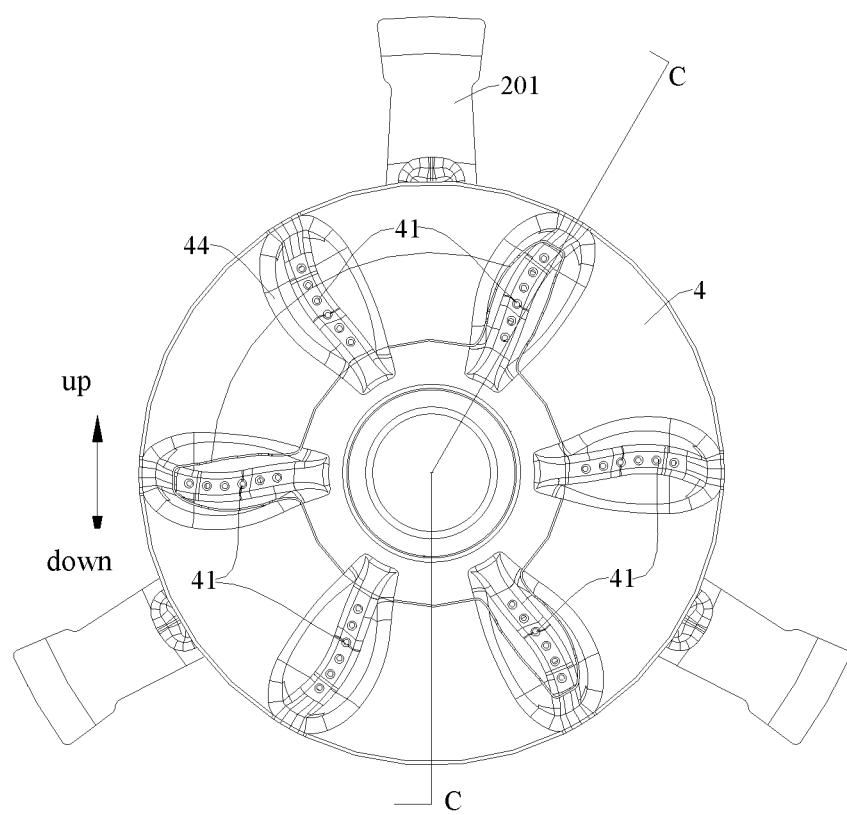
FIG. 22 is a schematic view of a drum washing machine viewed from the front to the rear, with a cabinet, drum and agitator removed.

As shown in FIGS. 22 and 23, according to another embodiment of the present disclosures, the agitator 4 has a water spray hole 41, the drum washing machine 100 further includes a water supply device (not shown), the water supply device is in communication with the tub 1 and the agitator 4 separately, and the water supply device supplies the water in the tub 1 to the agitator 4 and sprays water into the drum 2 through the water spray hole 41.

In the process of washing the laundry, the water supply device supplies water to the agitator 4, and water is sprayed to the laundry in the drum 2 through the water spray hole 41, to wet the laundry and improving the laundry wetting effect. The agitator 4 may agitate the water in the drum 2, which diversifies the washing mode of the drum washing machine 100, to improve the laundry washing effect and facilitating the reduction of the washing time.

According to some embodiments, the water supply device includes a water supply pipe and a water supply pump, and the water supply pipe has a first end and a second end. The first end of the water supply pipe is in communication with the tub 1, and the second end of the water supply pipe is connected to the agitator 4, to supply the water in the tub 1 to the agitator 4 through the water supply pipe. Herein, the term "connected" in the expression "the second end of the water supply pipe is connected to the agitator 4" should be understood broadly. For example, the water supply pipe may or may not be physically connected to the agitator 4, as long as the water from the second end of the water supply pipe may be supplied to the agitator 4.

Thus, the water in an inner cavity of the tub 1 is supplied to the agitator 4 through the water supply pipe, and the laundry may be wetted, and the laundry wetting effect is improved. By communicating the water supply device with the inner cavity of the tub 1, the laundry may be wetted by the washing water in the tub 1, without an additional water source, reducing the water consumption. It is understood that in some models without a circulating pump, the first end of the water supply pipe may also be directly connected to the water supply source for water supply, such as an external faucet, instead of using circulating water in the washing machine.

In some examples, the first end of the water supply pipe is in communication with a bottom of the inner cavity of the tub 1. In this way, the water supply pump may pump the water at the bottom of the inner cavity of the tub 1 to the agitator 4, and even if the drum washing machine 100 is in the washing mode with the lowest water level, the water supply device may still ensure the water supply to the agitator 4, to guarantee the wetting and washing effects of the drum washing machine 100 in different washing modes.

In some examples, the agitator 4 has a water collection cavity 42 and a water dividing passage 43 inside, and the water collection cavity 42 is in communication with the water supply device, and the water spray hole 41 is in communication with the water collection cavity 42 through the water dividing passage 43. By providing the water collection cavity 42 and the water dividing passage 43 in the agitator 4, the water supply device may transport the water to the water collection cavity 42 and the water dividing passage 43, and finally water is sprayed through the water spray hole 41 into the drum 2, to wet the laundry, and improving the laundry wetting effect and the washing effect.

In some examples, the surface of the agitator 4 facing the interior of the drum 2 is provided with a plurality of ribs 44, each of the ribs 44 extends in the radial direction of the agitator 4 and the plurality of ribs 44 is spaced apart from each other in the circumferential direction of the agitator 4. The water spray hole 41 is defined on the rib 44. When the laundry is washed, the water is sprayed toward the inner cavity of the drum 2 through the water spray hole 41, and the rib 44 enables the water in the drum 2 to generate a vortex to drive the laundry to rotate and turn over, to improve the laundry washing effect.

In some examples, the agitator 4 is configured as an impeller. That is, the impeller is provided at the bottom of the drum 2 of the drum washing machine 100. In the process of washing the laundry, the laundry in the drum 2 is lifted up and dropped continuously, and thus may be cleaned. Simultaneously, under the action of the impeller, the drum washing machine 100 according to the present disclosure is provided additionally with the impeller to rub the laundry based on the conventional method of dropping-washing the laundry (only with rotation of the drum), to further improve the washing effect and shortening the washing time.

As shown in FIGS. 21 and 23, in other examples, the second shaft 32 has a water supply passage 320 therein, and the water supply device supplies water in the tub 1 to the agitator 4 through the water supply passage 320. By providing the water supply passage 320 in the second shaft 32, the second shaft 32 has a function of transporting water, to transport the washing water in the tub 1 into the water supply passage 320 of the second shaft 32 through the water supply device, and finally spraying water through the water spray hole 41 into the tub 1.

In some examples, an end of the second shaft 32 extending out of the tub 1 is provided with an adapter 323, and the water supply device is connected with the second shaft 32 via the adapter 323. By providing the adapter 323 at the end of the second shaft 32 extending out of the tub 1, a water supply end of the water supply passage 320 is sealed, and the water supply device transports the water in the tub 1 into the water supply passage 320.

In some examples, the adapter 323 is fitted over one end of the second shaft 32 extending out of the tub 1, an adapter bearing 3231 is provided between the adapter 323 and the second shaft 32, an inner ring of the adapter bearing 3231 is fixedly connected with the second shaft 32, the outer ring of the adapter bearing 3231 is fixedly connected with the adapter 323, and the adapter bearing 3231 may be configured as two ball bearings arranged side by side, or a roller bearing. Thus, the rotatable connection between the second shaft 32 and the adapter 323 is realized by the adapter bearing 3231.

Advantageously, an adapter sealing member 3232 is fitted over the end of the second shaft 32 extending out of the tub 1, the adapter sealing member 3232 is further away from an axial center of the second shaft 32 compared with the adapter bearing 3231. The adapter sealing member 3232 seals a gap between the second shaft 32 and the adapter 323.

In one embodiment, the adapter sealing member 3232 and the adapter bearing 3231 are fitted over the end of the second shaft 32 extending out of the tub 1, and the adapter sealing member 3232 and the adapter bearing 3231 are arranged along an axial direction of the second shaft, and the adapter sealing member 3232 is located on an outside of the adapter bearing 3231. The adapter sealing member 3232 is sealedly connected to the second shaft 32 and the adapter 323 separately, to ensure a sealed connection between the adapter 323 and an outer side wall of the second shaft 32 and prevent water in the water supply passage 320 of the second shaft 32 from entering the cavity 311 of the main shaft 31, which otherwise affects normal operations of other components.

In some examples, a wear ring 324 is provided in the adapter 323, and the wear ring 324 is embedded in an inner side of the adapter 323. The end of the second shaft 32 extending out of the tub 1 extends into the wear ring 324, and both the adapter bearing 3231 and the adapter sealing member 3232 are fitted over the second shaft 32 and are located between an outer side wall of the second shaft 32 and the wear ring 324.

That is, the wear ring 324 is located between the adapter 323 and the adapter bearing 3231 and between the adapter 323 and the adapter sealing member 3232. By arranging the wear ring 324 in the adapter 323, an outer ring of the adapter bearing 3231 and the adapter sealing member 3232 are fitted with the wear ring 324 to reduce wear of the adapter 323 and prolong service life of thee adapter 323.

In some examples, a shaft sealing member 325 is fitted over the second shaft 32, and is provided on the second shaft 32 and located at an outer side of a second shaft end bearing 3212. That is, the shaft sealing member 325 is further away from the axial center of the second shaft 32 compared with the second shaft end bearing 3212, and the shaft sealing member 325 seals the gap between the second shaft 32 and the planetary gear casing 62, which prevents water in the water supply passage 320 of the second shaft 32 from entering the cavity 311 of the main shaft 31 and the planetary gear assembly 6 through the gap between the second shaft 32 and the planetary gear casing 62.

Some embodiments of the drum washing machine 100 according to the present disclosure will be described in detail below with reference to FIGS. 1 to 23.

As shown in FIGS. 1, 21 and 23, the drum washing machine 100 according to an embodiment of the present disclosure includes: a tub 1, a drum 2, a main shaft 31, a second shaft 32, a driver (such as an electric motor 5 described below), a planetary gear assembly 6 and a brake 7.

The tub 1 extends in a front and rear direction and has an open front end. The rear wall of the tub 1 is provided with a mounting hole 11 penetrating in a thickness direction thereof, and the mounting hole 11 is provided therein with a main shaft bearing seat 11 extending in the axial direction thereof.

The main shaft 31 extends in the front and rear direction and has a cavity 311 extending in the axial direction thereof, and the main shaft 31 passes through the main shaft bearing seat 11 through two spaced main shaft bearings 314. One end (front end shown in FIG. 1) of the main shaft 31 extending out of an inner surface of the rear wall of the tub 1 is fixedly connected with the drum support 201, and one end (rear end shown in FIG. 1) of the main shaft 31 extending out of an outer surface of the rear wall of the tub 1 is connected with the lock nut 313, the pulley 312 for mounting the belt 3121 is provided between the lock nut 313 and the outer surface of the rear wall of the main shaft 31, and the pulley 312 is in transmission connection with the electric motor shaft 51 of the electric motor 5 through the belt 3121.

The drum 2 includes the drum body 21 and the rear cover 22 of the drum. The drum body 21 extends in the axial direction of the tub 1 and has two open ends. The rear cover 22 of the drum is hermetically connected at the rear end of the drum body 21, and the drum 2 is rotatably mounted in the tub 1 by the drum support 201. The drum support 201 includes a central shaft portion 2011 and a support portion 2012 connected to an outer side wall of the central shaft portion 2011. The drum 2 is supported on the support portion 2012, and the central shaft portion 2011 is rotatably supported on the rear wall of the tub 1.

The second shaft 32 passes through the cavity 311 of the main shaft 31 by at least two second shaft bearings 3211 spaced apart in the axial direction thereof. The two ends of the second shaft 32 extend out of the two ends of the main shaft 31 respectively, one end (front end shown in FIG. 1) of the second shaft 32 extending out of the main shaft 31 is fitted with the planetary gear assembly 6 through the second shaft end bearing 3212, and the shaft sealing member 325 located at an outer side of the second shaft end bearing 3212 is further provided between the planetary gear assembly 6 and the second shaft 31, to guarantee the sealed connection between the planetary gear assembly 6 and the second shaft 31. The other end (such as a rear end shown in FIG. 1) of the second shaft 32 extending out of the main shaft 31 is mounted with the brake disk 322.

The agitator 4 is rotatably provided at the bottom of the drum 2 and cooperates with the planetary gear assembly 6 (such as the planetary gear casing 62 described below).

The planetary gear assembly 6 of the drum washing machine 100 according to the embodiment of the present disclosure will be described in detail below.

The planetary gear assembly 6 includes the planetary gear component 61, the planetary gear casing 62, and the planetary gear bearing 63. The planetary gear casing 62 has a through hole 622, the planetary gear component 61 is provided in the planetary gear casing 62, the planetary gear bearing 63 is provided in the planetary gear casing 62 and is located on a side of the planetary gear casing 62 back on to the through hole 622, and the planetary gear bearing 63 is provided at the rear of the planetary gear casing 62.

The planetary gear component 61 includes the planet carrier 611, three planetary gears 612, and the planetary gear outer teeth casing 613. The planet carrier 611 includes the planetary gear support 6111 and the planetary gear fixing disk 6116. One side of the planetary gear support 6111 is provided with the plurality of mounting bosses 6112 and the plurality of planetary gear mounting seats 6114. The plurality of mounting bosses 6112 and the plurality of planetary gear mounting seats 6114 are arranged alternately in the circumferential direction of the planet carrier 611. Each of the planetary gear mounting seats 6114 is provided with the planetary gear fixing shaft 6115. One end of the planetary gear fixing shaft 6115 is provided in the planetary gear mounting seat 6114, and the other end is provided in the limiting hole 6118 of the planetary gear fixing disk 6116, suitable to be engaged and configured to mount the planetary gear 612; each of the mounting bosses 6112 is provided with the positioning column 6113, and the planetary gear fixing plate 6116 is provided with the positioning hole 6117 engaged with the positioning column 6113. By welding the positioning column 6113 at the positioning hole 6117, or make the positioning column 6113 close fit with the positioning hole 6117, the planetary gear fixing plate 6116 is connected to the planetary gear support 6111. The three planetary gears 612 are mounted on the planet carrier 611 and mesh with the planetary gear outer teeth casing 613 respectively.

The planetary gear outer teeth casing 613 of the planetary gear component 61 is provided with the flange 6131 protruding from the outer surface, and the inner surface of the planetary gear casing 62 is provided with the latching slot 621 engaged with the flange 6131, to fixedly connect the planetary gear outer teeth casing 613 with the planetary gear casing 62.

The planetary gear assembly 6 is rotatably fitted to the second shaft 32 via the second shaft end bearing 3212. The planetary gear assembly 6 is rotatably fitted to the main shaft 31 via the planetary gear bearing 63. In one embodiment, the main shaft sleeve 316 is fitted over the main shaft 31, the main shaft sleeve 316 is provided with the main shaft flange 315 connected to the drum support 201, the wear sleeve 642 is fitted over the planetary gear assembly 6, the wear sleeve 624 is provided with the assembly sealing member 641, and the sealed connections between the planetary gear assembly 6 and the drum support 201 as well as the planetary gear assembly 6 and the main shaft flange 315 are realized by the assembly sealing member 641.

The brake 7 of the drum washing machine 100 according to an embodiment of the present disclosure will be described in detail below.

The brake 7 is arranged at a rear portion of the tub 1 and includes a sliding groove seat 71, a brake lever 72, a brake driver 73 and a brake cam 74.

The sliding groove seat 71 is arranged on a rear wall of the tub 1 through a brake support 75, and the brake support 75 is provided with a limiting sliding groove 751 extending along a radial direction of brake disk 322. A linearly extending slideway 711, a circumferentially positioned sliding groove 713, and a support sliding groove 714 are arranged in the sliding groove seat 71 is provided with. A limiting boss 712 is arranged in the slideway 711, and the sliding groove seat 71 is also provided with a via hole 715 in communication with the slideway 711.

The brake lever 72 is slidably fitted with the slideway 711 between the extending position and the retracting position. The brake lever 72 includes a slideway fitting portion 721, a transmission portion 722, a bridge portion 723, and a brake portion 724. The two ends of the slideway fitting portion 721 are connected with the transmission portion 722 and the bridge portion 723 respectively, and the brake portion 724 is connected to an end of the bridge portion 723 away from the slideway fitting portion 721.

The slideway fitting portion 721 is slidably fitted with the slideway 711, and a cross-section of the slideway fitting portion 721 and a minimum cross-section of the slideway 711 are mutually matched circles. The slideway fitting portion 721 is provided with a plurality of axial reinforcing ribs 7211. Each of the axial reinforcing ribs extends along an axial direction of the slideway fitting portion 721 and a plurality of the axial reinforcing ribs 7211 are spaced apart from each other along a circumferential direction of the slideway fitting portion 721.

The transmission portion 722 is slidably supported on the support sliding groove 714. A side of the transmission portion 722 is provided with a limiting block 720 slidably fitted with the circumferentially positioned sliding groove 713. By arranging the limiting boss 712 in the slideway 711 to be fitted with the limiting block 720 on the brake lever 72, a moving path of the limiting lever 72 is limited. That is, the brake lever 72 may be axially limited to prevent the brake lever 72 from sliding out of the slideway 711, thus further ensuring the operating reliability of the brake 7. Another side of the transmission portion 722 is provided with a straight sliding groove 725.

The bridge portion 723 is provided with a plurality of transverse reinforcing ribs 7231 and a plurality of longitudinal reinforcing ribs 7232. Each transverse reinforcing rib 7231 extends along a width direction of the bridge portion 723 and the plurality of transverse reinforcing ribs 7231 are spaced apart from each other along a length direction of the bridge portion 723. Each longitudinal reinforcing rib 7232 extends along a length direction of the bridge portion 723 and the plurality of longitudinal reinforcing ribs 7232 spaced apart from each other along a width direction of the bridge portion 723. Each longitudinal reinforcing rib 7232 is connected to the plurality of transverse reinforcing ribs 7231 respectively.

The brake portion 724 is engaged with the brake disk 322 when the brake lever 72 is in the extending position, while the brake portion 724 is disengaged from the brake disk 322 when the brake lever 72 is in the retracting position.

The brake cam 74 is mounted at the via hole 715 of the sliding groove seat 71 and has an eccentric column 741. The brake driver 73 is used to drive the brake cam 74 to rotate, and the eccentric column 741 rotates eccentrically. The eccentric column 741 is fitted with the straight sliding groove 725 on the transmission portion 722 to further drive the brake lever 72 to move linearly.

According to another embodiment of the present disclosure, an end of the second shaft 32 extending out of the tub 1 is provided with an adapter 323 for connecting the water supply device. The adapter 323 is fitted over the second shaft 32 through the adapter bearing 3231, and the adapter sealing member 3232 sealingly connected to the adapter 323 is fitted over the second shaft 32. The adapter sealing member 3232 is located on an outside of the adapter bearing 3231.

Furthermore, the water supply passage 320 is provided in the second shaft 32 and extends along the axial direction of the second shaft 32. A first end of the water supply passage 320 is in communication with the adapter 323, and a second end of the water supply passage 320 is in communication with the agitator 4. The agitator 4 has the water collection cavity 42 to be in communication with the water supply passage 320, the water dividing passage 43 defined by the rib 44, and the water spray hole 41 defined on the rib 44.

The water supply device includes the water supply pipe and the water supply pump. The first end of the water supply pipe is in communication with the tub 1, the second end of the water supply pipe is in communication with the water supply passage 320, and the water supply pump is arranged on the water supply pipe, and when the water supply pump is working, the water in the tub 1 is conveyed into the agitator 4 via the water supply pipe and the water supply passage 320.

The working process of the drum washing machine 100 according to an embodiment of the present disclosure will be described in detail below.

When the drum washing machine 100 is operating in the washing mode, the brake driver 73 drives the brake lever 72 to move to the extending position, and the brake portion 724 of the brake lever 72 is engaged with the brake disk 322 to lock the brake disk 322, and the second shaft 32 is fixed, and since the planet carrier 611 of the planetary gear assembly 6 is fitted with the second shaft 32 by a spline structure, the planet carrier 611 is also fixed, and only the plurality of planetary gears 612 on the planet carrier 611 are rotatable on their own axes.

Subsequently, when the electric motor 5 is in operation, the pulley 312 is driven to rotate in a forward direction by the belt 3121, and the main shaft 31 and the drum 2 are driven to rotate in the forward direction. Since the main shaft 31 meshes with the plurality of planetary gears 612, the main shaft 31 may simultaneously drive the plurality of planetary gears 612 to rotate when rotating, which further drives the planetary gear outer teeth casing 613 to rotate in the opposite direction. Since the planetary gear outer teeth casing 613 is connected with the planetary gear casing 62 and the planetary gear casing 62 is connected with the agitator 4, the main shaft 31 drives the agitator to rotate in the opposite direction by the planetary gear assembly 6.

In this process, the laundry in the drum 2 is lifted up and dropped continuously, and thus may be washed clean. Simultaneously, under the action of the agitator 4, the drum washing machine 100 according to the present disclosure is provided additionally with the impeller to rub the laundry based on the conventional method of dropping and washing the laundry (only the drum is rotated), to further improve the washing effect and shortening the washing time.

When the agitator 4 has the water spray hole 41, the water supply pump may supply water to the agitator 4 through the water supply passage 320 of the second shaft 2 or through the water supply pipe, to cause the water spray hole 41 to spray water to the laundry in the drum 2, which wets the laundry, improves the laundry wetting effect, and further improves the laundry washing effect.

It is understood that when the drum washing machine 100 is in the washing mode, the planetary gear assembly 6 transmits the forward rotation of the main shaft 31 as the reversed rotation of the agitator 4, and at the same time, the planetary gear assembly 6 is in transmission connection with the main shaft 31, which may reduce the speed of the main shaft 31, to make the rotational speed of the agitator 4 less than the rotational speed of the main shaft 31. Here, the "forward rotation" and "reversed rotation" are relative terms and do not refer to a counterclockwise or clockwise rotation.

When the drum washing machine 100 is operating in the spin mode, the brake driver 73 drives the brake lever 72 to move to the retracting position, the brake portion 724 of the brake lever 72 releases the brake disk 322, and the second shaft 32 is in the free state.

Subsequently, when the electric motor 5 drives the pulley 312 to rotate in the forward direction through the belt 3121, the main shaft 31 and the drum 2 may be driven to rotate in the forward direction, and then the main shaft 31 drives the planetary gear 612 to rotate on its axis, to drive the planetary gear casing 62, the agitator 4 and the drum 2 to rotate in the same direction and at the same speed.

In the drum washing machine 100 according to the embodiment of the present disclosure, by providing the driver, the driver drives the drum 2 via the main shaft 31, the number of levels of power transmission is less, and the power transmission is more direct, to stabilize the operation of the drum 2. The planetary gear assembly 6 is provided between the main shaft 31 and the agitator 4, and the torque of the main shaft 31 is transmitted to the agitator 4 by the planetary gear assembly 6. Since the load of the agitator 4 is much less than the load of the drum 2, compared with the drum washing machine with an impeller in the related art, the load acting on the planetary gear assembly 6 is greatly reduced, which greatly reduces the risk of damage to the planetary gear assembly 6 to prolong the service life of the drum washing machine 100.

Other components and operations of the drum washing machine 100 according to the embodiments of the present disclosure are known and will not be described in detail herein.

In the description of the present specification, reference throughout this specification to "an embodiment", "some embodiments", "exemplary embodiment", "example", "specific example" or "some examples" means that a particular feature, structure, material, or characteristic described in connection with the embodiment or example is included in at least an embodiment or example of the present disclosure. In the specification, the schematic expressions to the above-mentioned terms are not necessarily referring to the same embodiment or example. Furthermore, the described particular features, structures, materials, or characteristics may be combined in any suitable manner in one or more embodiments or examples.

What is claimed is:

1. A planetary gear assembly for a drum washing machine, comprising:
   a planetary gear component and a planetary gear casing, wherein the planetary gear component comprises:
   a planet carrier;
   a plurality of planetary gears rotatably mounted to the planet carrier separately and configured to be meshed with a main shaft separately, the main shaft being configured to drive a drum to rotate in a drum washing machine; and
   a planetary gear outer teeth casing fitted over an outer side of the plurality of planetary gears, meshed with the plurality of planetary gears separately, and configured to be in transmission connection with an agitator in the drum;
   wherein the planetary gear component is provided in the planetary gear casing, and the planetary gear outer teeth casing is in transmission connection with the agitator via the planetary gear casing.

2. The planetary gear assembly according to claim 1, wherein when the planet carrier is allowed to rotate freely, the plurality of planetary gears transmit a torque of the main shaft to the planetary gear outer teeth casing in a same direction, and when the planet carrier is braked, the plurality of planetary gears transmit the torque of the main shaft to the planetary gear outer teeth casing in an opposite direction.

3. The planetary gear assembly according to claim 2, wherein when the planet carrier is braked, a rotational speed of the planetary gear outer teeth casing is less than a rotational speed of the main shaft.

4. The planetary gear assembly according to claim 2, wherein when the planet carrier is allowed to rotate freely, a rotational speed of the planetary gear outer teeth casing is equal to a rotational speed of the main shaft.

5. The planetary gear assembly according to claim 2, wherein the planet carrier comprises:
   a planetary gear support, wherein the plurality of planetary gears are rotatably mounted on a side face of the planetary gear support, and the side face of the planetary gear support is provided with a plurality of mounting bosses; and
   a planetary gear fixing disk mounted on the plurality of mounting bosses.

6. The planetary gear assembly according to claim 5, wherein the planetary gear support and the planetary gear fixing disk are both located in the planetary gear outer teeth casing, and the planetary gear support and the planetary gear fixing disk are stopped at two sides of internal teeth of the planetary gear outer teeth casing respectively to be positioned in an axial direction of the planetary gear outer teeth casing.

7. The planetary gear assembly according to claim 5, wherein the side face of the planetary gear support is provided with a plurality of planetary gear mounting seats, each of the planetary gear seats is provided with a planetary gear fixing shaft, and the plurality of planetary gears are rotatably mounted to the plurality of planetary gear fixing shafts in one-to-one correspondence respectively.

8. The planetary gear assembly according to claim 5, wherein the plurality of mounting bosses and the plurality of planetary gears are arranged alternately in a circumferential direction of the planetary gear support, each of the mounting bosses is provided with a positioning column, the planetary gear fixing disk is provided with a plurality of positioning holes, and positioning columns on the plurality of mounting bosses are fitted in the plurality of positioning holes in one-to-one correspondence.

9. The planetary gear assembly according to claim 1, wherein one of an inner peripheral wall of the planetary gear casing and an outer peripheral wall of the planetary gear outer teeth casing is provided with a flange, another one of the inner peripheral wall of the planetary gear casing and the outer peripheral wall of the planetary gear outer teeth casing is provided with a latching slot, and the flange is fitted in the latching slot.

10. The planetary gear assembly according to claim 9, wherein the outer peripheral wall of the planetary gear outer teeth casing is provided with a plurality of flanges, each of the flanges extends in an axial direction of the planetary gear outer teeth casing, the plurality of flanges are spaced apart from each other in a circumferential direction of the planetary gear outer teeth casing, the inner peripheral wall of the planetary gear casing is provided with a plurality of latching slots, each of the latching slots extends in an axial direction of the planetary gear casing, the plurality of latching slots are spaced apart from each other in a circumferential direction of the planetary gear casing, and the plurality of flanges are fitted in the plurality of latching slots in one-to-one correspondence.

11. The planetary gear assembly according to claim 1, further comprising:
   a planetary gear bearing provided in the planetary gear casing and located on an outer side of the planetary gear component, wherein an inner ring of the planetary gear bearing is fitted over the main shaft and rotates with the main shaft, and an outer ring of the planetary gear bearing is connected to the planetary gear casing and rotates with the planetary gear casing.

12. The planetary gear assembly according to claim 1, wherein an inner peripheral surface of the planet carrier is provided with meshing teeth meshing with a second shaft in the main shaft.

13. The planetary gear assembly according to claim 12, further comprising a second shaft end bearing, wherein the planetary gear casing is provided with a through hole, the second shaft passes through the through hole, and the second shaft end bearing is provided in the through hole and configured to support the second shaft.

14. The planetary gear assembly according to claim 13, further comprising a shaft sealing member located in the through hole and at an outer side of the second shaft end bearing, and configured to seal a gap between the second shaft and the planetary gear casing.

15. A drum washing machine comprising a planetary gear assembly, wherein the planetary gear assembly comprises:
a planetary gear component and a planetary gear casing, wherein the planetary gear component comprises:
a planet carrier;
a plurality of planetary gears rotatably mounted to the planet carrier separately and configured to be meshed with a main shaft separately, the main shaft being configured to drive a drum to rotate in a drum washing machine; and
a planetary gear outer teeth casing fitted over an outer side of the plurality of planetary gears, meshed with the plurality of planetary gears separately, and configured to be in transmission connection with an agitator in the drum;
wherein the planetary gear component is provided in the planetary gear casing, and the planetary gear outer teeth casing is in transmission connection with the agitator via the planetary gear casing.

* * * * *